(12) United States Patent
Roumeliotis et al.

(10) Patent No.: US 12,529,563 B2
(45) Date of Patent: *Jan. 20, 2026

(54) VISION-AIDED INERTIAL NAVIGATION

(71) Applicant: Regents of the University of Minnesota, Minneapolis, MN (US)

(72) Inventors: Stergios I. Roumeliotis, St Paul, MN (US); Anastasios I. Mourikis, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 260 days.

This patent is subject to a terminal disclaimer.

(21) Appl. No.: 18/051,469

(22) Filed: Oct. 31, 2022

(65) Prior Publication Data

US 2023/0194266 A1  Jun. 22, 2023
US 2024/0011776 A9  Jan. 11, 2024

Related U.S. Application Data

(63) Continuation of application No. 17/457,022, filed on Nov. 30, 2021, now Pat. No. 11,486,707, which is a (Continued)

(51) Int. Cl.
  *G01C 21/16* (2006.01)
  *G05D 1/00* (2006.01)
  *H04W 4/02* (2018.01)

(52) U.S. Cl.
  CPC ......... *G01C 21/1656* (2020.08); *G01C 21/16* (2013.01); *G01C 21/165* (2013.01); *G05D 1/00* (2013.01); *H04W 4/027* (2013.01)

(58) Field of Classification Search
  CPC .. G01C 21/1656; G01C 21/16; G01C 21/165; G05D 1/00; H04W 4/027
  See application file for complete search history.

(56) References Cited

U.S. PATENT DOCUMENTS 5,847,755 A   12/1998  Wixson et al.
6,104,861 A    8/2000  Tsukagoshi
(Continued)

FOREIGN PATENT DOCUMENTS

FR     3013487 A1 * 5/2015 ............ G06T 7/248
WO  2000034803 A2    6/2000
(Continued)

OTHER PUBLICATIONS

U.S. Appl. No. 15/470,595, filed Mar. 27, 2017, by Stergios I. Roumeliotis.
(Continued)

*Primary Examiner* — Tung S Lau
(74) *Attorney, Agent, or Firm* — KPPB LLP

(57) ABSTRACT

Localization and navigation systems and techniques are described. An electronic device comprises a processor configured to maintain a state vector storing estimates for a position of the electronic device at poses along a trajectory within an environment along with estimates for positions for one or more features within the environment. The processor computes, from the image data, one or more constraints based on features observed from multiple poses of the electronic device along the trajectory, and computes updated state estimates for the position of the electronic device in accordance with the motion data and the one or more computed constraints without computing updated state estimates for the features for which the one or more constraints were computed.

20 Claims, 4 Drawing Sheets

Related U.S. Application Data continuation of application No. 16/871,560, filed on May 11, 2020, now Pat. No. 11,519,729, which is a continuation of application No. 15/706,149, filed on Sep. 15, 2017, now Pat. No. 10,670,404, which is a continuation of application No. 12/383,371, filed on Mar. 23, 2009, now Pat. No. 9,766,074.

(60) Provisional application No. 61/040,473, filed on Mar. 28, 2008.

(56) References Cited

U.S. PATENT DOCUMENTS

| | | | |
|---|---|---|---|
| 6,243,106 | B1 * | 6/2001 | Rehg .................. G06T 7/246 345/473 |
| 6,496,778 | B1 | 12/2002 | Lin |
| 7,000,469 | B2 | 2/2006 | Foxlin et al. |
| 7,015,831 | B2 | 3/2006 | Karlsson et al. |
| 7,162,338 | B2 | 1/2007 | Goncalves et al. |
| 7,272,467 | B2 | 9/2007 | Goncalves et al. |
| 7,747,151 | B2 | 6/2010 | Kochi et al. |
| 7,991,576 | B2 | 8/2011 | Roumeliotis |
| 8,510,039 | B1 | 8/2013 | Troy et al. |
| 8,577,539 | B1 | 11/2013 | Morrison et al. |
| 8,676,498 | B2 | 3/2014 | Ma et al. |
| 8,761,439 | B1 | 6/2014 | Kumar et al. |
| 8,965,682 | B2 | 2/2015 | Tangirala et al. |
| 8,996,311 | B1 | 3/2015 | Morin et al. |
| 9,026,263 | B2 | 5/2015 | Hoshizaki |
| 9,031,809 | B1 | 5/2015 | Kumar et al. |
| 9,227,361 | B2 | 1/2016 | Choi et al. |
| 9,243,916 | B2 | 1/2016 | Roumeliotis et al. |
| 9,303,999 | B2 | 4/2016 | Hesch et al. |
| 9,341,704 | B2 | 5/2016 | Picard et al. |
| 9,607,401 | B2 | 3/2017 | Roumeliotis et al. |
| 9,658,070 | B2 | 5/2017 | Roumeliotis et al. |
| 9,709,404 | B2 | 7/2017 | Roumeliotis et al. |
| 9,766,074 | B2 | 9/2017 | Roumeliotis et al. |
| 9,996,941 | B2 | 6/2018 | Roumeliotis et al. |
| 10,012,504 | B2 | 7/2018 | Roumeliotis et al. |
| 10,203,209 | B2 | 2/2019 | Roumeliotis et al. |
| 10,254,118 | B2 | 4/2019 | Roumeliotis et al. |
| 10,339,708 | B2 | 7/2019 | Lynen et al. |
| 10,371,529 | B2 | 8/2019 | Roumeliotis et al. |
| 10,670,404 | B2 * | 6/2020 | Roumeliotis ...... G01C 21/1656 |
| 11,486,707 | B2 * | 11/2022 | Roumeliotis .......... G01C 21/16 |
| 11,519,729 | B2 | 12/2022 | Roumeliotis et al. |
| 2002/0198632 | A1 | 12/2002 | Breed et al. |
| 2003/0149528 | A1 | 8/2003 | Lin |
| 2004/0073360 | A1 | 4/2004 | Foxlin |
| 2004/0167667 | A1 | 8/2004 | Goncalves et al. |
| 2005/0013583 | A1 | 1/2005 | Itoh |
| 2007/0038374 | A1 | 2/2007 | Belenkii et al. |
| 2008/0167814 | A1 | 7/2008 | Samarasekera et al. |
| 2008/0265097 | A1 | 10/2008 | Stecko et al. |
| 2008/0279421 | A1 | 11/2008 | Hamza et al. |
| 2009/0212995 | A1 | 8/2009 | Wu et al. |
| 2009/0248304 | A1 | 10/2009 | Roumeliotis et al. |
| 2010/0110187 | A1 | 5/2010 | Von Flotow et al. |
| 2010/0211316 | A1 | 8/2010 | Da Silva et al. |
| 2010/0220176 | A1 | 9/2010 | Ziemeck et al. |
| 2011/0178708 | A1 | 7/2011 | Zhang et al. |
| 2011/0206236 | A1 | 8/2011 | Center, Jr. |
| 2011/0238307 | A1 | 9/2011 | Psiaki et al. |
| 2012/0121161 | A1 | 5/2012 | Eade et al. |
| 2012/0194517 | A1 | 8/2012 | Izadi et al. |
| 2012/0203455 | A1 | 8/2012 | Louis et al. |
| 2013/0138264 | A1 | 5/2013 | Hoshizaki |
| 2013/0304383 | A1 | 11/2013 | Bageshwar et al. |
| 2013/0335562 | A1 | 12/2013 | Ramanandan et al. |
| 2014/0316698 | A1 | 10/2014 | Roumeliotis et al. |
| 2014/0333741 | A1 | 11/2014 | Roumeliotis et al. |
| 2014/0372026 | A1 | 12/2014 | Georgy et al. |
| 2015/0092048 | A1 | 4/2015 | Brunner et al. |
| 2015/0219767 | A1 | 8/2015 | Humphreys et al. |
| 2015/0356357 | A1 | 12/2015 | McManus et al. |
| 2015/0369609 | A1 | 12/2015 | Roumeliotis et al. |
| 2016/0005164 | A1 | 1/2016 | Roumeliotis et al. |
| 2016/0161260 | A1 | 6/2016 | Mourikis |
| 2016/0267678 | A1 * | 9/2016 | Cleveland ............... G06T 7/246 |
| 2016/0305784 | A1 | 10/2016 | Roumeliotis et al. |
| 2016/0327395 | A1 | 11/2016 | Roumeliotis et al. |
| 2016/0364990 | A1 | 12/2016 | Khaghani et al. |
| 2017/0176189 | A1 | 6/2017 | D'aquila |
| 2017/0261324 | A1 | 9/2017 | Roumeliotis et al. |
| 2017/0294023 | A1 | 10/2017 | Roumeliotis et al. |
| 2017/0336511 | A1 | 11/2017 | Nerurkar et al. |
| 2017/0343356 | A1 | 11/2017 | Roumeliotis et al. |
| 2017/0345166 | A1 | 11/2017 | Polle |
| 2018/0023953 | A1 | 1/2018 | Roumeliotis et al. |
| 2018/0082137 | A1 | 3/2018 | Melvin et al. |
| 2018/0211137 | A1 | 7/2018 | Hesch et al. |
| 2018/0259341 | A1 | 9/2018 | Aboutalib et al. |
| 2018/0328735 | A1 | 11/2018 | Roumeliotis et al. |
| 2019/0154449 | A1 | 5/2019 | Roumeliotis et al. |
| 2019/0178646 | A1 | 6/2019 | Roumeliotis et al. |
| 2019/0368879 | A1 | 12/2019 | Roumeliotis et al. |
| 2019/0392630 | A1 | 12/2019 | Sturm et al. |
| 2020/0300633 | A1 | 9/2020 | Roumeliotis et al. |
| 2021/0004979 | A1 | 1/2021 | Valentin et al. |
| 2022/0082386 | A1 * | 3/2022 | Roumeliotis ........ G01C 21/165 |

FOREIGN PATENT DOCUMENTS

| | | |
|---|---|---|
| WO | 2015013418 A2 | 1/2015 |
| WO | 2015013534 A1 | 1/2015 |
| WO | 2018026544 A1 | 2/2018 |

OTHER PUBLICATIONS

U.S. Appl. No. 15/601,261, filed May 22, 2017, by Stergios I. Roumeliotis.

U.S. Appl. No. 15/605,448, filed May 25, 2017, by Stergios I. Roumeliotis.

U.S. Appl. No. 16/425,422, filed May 29, 2019.

U.S. Appl. No. 14/733,468 by Stergios I. Roumeliotis et al., filed Jun. 8, 2015.

U.S. Appl. No. 14/796,574, filed Jul. 10, 2015, 89 Pgs.

"Kalman filter", Wikipedia, the Free Encyclopedia, accessed from https://en.wikipedia.org/w/index.php?title=Kalman_filter&oldid=615383582, Jul. 3, 2014, 27 pgs.

"Kalman filter", Wikipedia, the Free Encyclopedia, accessed from https://en.wikipedia.org/w/index.php?title=kalman_filter&oldid=730505034 Jul. 9, 2016, 30 pgs.

"Project Tango", retrieved from https://www.google.com/atap/projecttango on Nov. 2, 2015, 4 pages.

Agarwal et al., "A Survey of Geodetic Approaches to Mapping and the Relationship to Graph-Based SLAM", IEEE Robotics and Automation Magazine, Sep. 2014, vol. 31, 17 pgs.

Ait-Aider et al., "Simultaneous object pose and velocity computation using a single view from a rolling shutter camera", Proceedings of the IEEE European Conference on Computer Vision, May 7-13, 2006, pp. 56-68.

Antone, "Robust Camera Pose Recovery Using Stochastic Geometry", Massachusetts Institute of Technology, Apr. 24, 2001, 187 pages.

Ayache et al., "Maintaining Representations of the Environment of a Mobile Robot", IEEE Transactions on Robotics and Automation, Dec. 1989, vol. 5, No. 6, pp. 804-819.

Bailey et al., "Simultaneous Localisation and Mapping (SLAM): Part II", IEEE Robotics and Automation Magazine, Sep. 2006, vol. 13, No. 3, 10 pgs.

Baker et al., "Removing rolling shutter wobble", Proceedings of the IEEE Conference on Computer Vision and Pattern Recognition, Jun. 13-18, 2010, pp. 2392-2399.

Bar-Shalom et al., "Estimation with Applications to Tracking and Navigation", Chapter 7, Estimation with Applications to Tracking and Navigation, Jul. 2001, ISBN 0-471-41655-X, 20 pgs.

(56) References Cited

OTHER PUBLICATIONS

Bartoli et al., "Structure-from-Motion Using Lines: Representation, Triangulation, and Bundle Adjustment", Computer Vision and Image Understanding, 2005, vol. 100, pp. 416-441.
Bayard et al., "An Estimation Algorithm for Vision-Based Exploration of Small Bodies in Space", American Control Conference, Jun. 8-10, 2005, pp. 4589-4595.
Bierman, "Factorization Methods for Discrete Sequential Estimation", Mathematics in Science and Engineering, Academic Press, vol. 128, 1977, 259 pgs.
Bloesch et al., "Iterated Extended Kalman Filter Based Visual-Inertial Odometry Using Direct Photometric Feedback", International Journal of Robotics Research, Sep. 2017, vol. 36, 19 pgs.
Bloesch et al., "Robust Visual Inertial Odometry Using a Direct EKF-Based Approach", Proceeding of the IEEE/RSJ International Conference on Intelligent Robots and Systems, Sep. 2015, 7 pgs.
Bouguet, "Camera Calibration Toolbox for Matlab", Retrieved from: http://www.vision.caltech.edu/bouguetj/calib_doc/, 2004, Last Updated: Oct. 14, 2015, 5 pgs.
Boyd et al., "Convex Optimization", Cambridge University Press, 2004, 730 pgs., (Applicant points out that, in accordance with MPEP 609.04(a), the 2004 year "continued in misc", publication is sufficiently earlier than the effective U.S. filing date and any foreign priority date of Feb. 21, 2013 so that the particular month of publication is not in issue.).
Breckenridge, "Interoffice Memorandum to T. K. Brown, Quaternions—Proposed Standard Conventions", IOM 343-79-1199, Oct. 31, 1979, 12 pgs.
Burri et al., "The EuRoC Micro Aerial Vehicle Datasets", International Journal of Robotics Research, 10, Sep. 2016, vol. 35, No. 10, 9 pgs.
Canny, "A Computational Approach To Edge Detection", IEEE Transactions on Pattern Analysis and Machine Intelligence, Nov. 1986 vol. 8, No. 6, pp. 679-698.
Chauhan et al., "Femoral Artery Pressures Are More Reliable Than Radial Artery Pressures on Initiation of Cardiopulmonary Bypass", Journal of Cardiothoracic and Vascular Anesthesia, Jun. 2000, vol. 14, No. 3, 3 pgs.
Chen, "Pose Determination from Line-to-Plane Correspondences: Existence Condition and Closed-Form Solutions", Proceedings on the 3rd International Conference on Computer Vision, Dec. 4-7, 1990, pp. 374-378.
Chen et al., "Local Observability Matrix and its Application to Observability Analyses", Proceedings of the 16th Annual Conference IEEE Industrial Electronics Society, Nov. 1990, 4 pgs.
Chiu et al., "Robust vision-aided navigation using sliding-window factor graphs", 2013 IEEE International Conference on Robotics and Automation, May 6-10, 2013, pp. 46-53.
Chiuso et al., "Structure from Motion Causally Integrated Over Time", IEEE Transactions on Pattern Analysis and Machine Intelligence, Apr. 2002, vol. 24, No. 4, pp. 523-535.
Comport et al., "Accurate Quadrifocal Tracking for Robust 3D Visual Odometry", IEEE International Conference on Robotics and Automation, 2007, pp. 40-45.
Cumani et al., "Integrating Monocular Vision and Odometry for SLAM", WSEAS Transactions on Computers, 2003, 6 pages.
Davison et al., "Simultaneous Localisation and Map-Building Using Active Vision", Jun. 2001, 18 pgs.
Deans, "Maximally Informative Statistics for Localization and Mapping", Proceedings of the 2002 IEEE International Conference on Robotics & Automation, May 2002, pp. 1824-1829.
Dellaert et al., "Square Root SAM: Simultaneous Localization and Mapping via Square Root Information Smoothing", International Journal of Robotics and Research, Dec. 2006, vol. 25, No. 12, pp. 1181-1203.
Diel, "Stochastic Constraints for Vision-Aided Inertial Navigation", Massachusetts Institute of Technology, Department of Mechanical Engineering, Master Thesis, [Feb. 2005], 110 pgs.
Diel, "Stochastic Constraints for Vision-Aided Inertial Navigation", Massachusetts Institute of Technology, Department of Mechanical Engineering, Master Thesis, Jan. 2005, 110 pages.
Diel et al., "Epipolar Constraints for Vision-Aided Inertial Navigation", Seventh IEEE Workshops on Applications of Computer Vision (WACV/Motion'05), vol. 1, 2005, pp. 221-228.
Dong-Si et al., "Motion Tracking with Fixed-lag Smoothing: Algorithm and Consistency Analysis", Proceedings of the IEEE International Conference on Robotics and Automation, May 9-13, 2011, 8 pgs.
Durrant-Whyte et al., "Simultaneous Localisation and Mapping (SLAM): Part I The Essential Algorithms", IEEE Robotics & Automation Magazine, Jun. 2006, vol. 13, No. 2, pp. 99-110.
Dutoit et al., "Consistent Map-based 3D Localization on Mobile Devices", Proceedings of the IEEE International Conference on robotics and Automation, May 2017, 8 pgs.
Eade et al., "Monocular SLAM as a Graph of Coalesced Observations", IEEE 11th International Conference on Computer Vision, 2007, pp. 1-8.
Eade et al., "Scalable Monocular SLAM", Proceedings of the 2006 IEEE Computer Society Conference on Computer Vision and Pattern Recognition (CVPR '06), Jun. 17-22, 2006, vol. 1, 8 pgs.
Engel et al., "Direct Sparse Odometry", IEEE Transactions on Pattern Analysis and Machine Intelligence, Mar. 2018, vol. 40, No. 3, 15 pgs.
Engel et al., "LSD-SLAM: Large-Scale Direct Monocular SLAM", Proceedings of the European Conference on Computer Vision, Sep. 2014, 16 pp.
Engel et al., "Semi-Dense Visual Odometry for a Monocular Camera", Proceedings of the IEEE International Conference on Computer Vision, Dec. 2013, 8 pp.
Erdogan et al., "Planar Segmentation of RGBD Images using Fast Linear Fitting and Markov Chain Monte Carlo", Proceedings of the IEEE International Conference on Computer and Robot Vision, May 27-30, 2012, pp. 32-39.
Eustice et al., "Exactly Sparse Delayed-state Filters for View-based SLAM", IEEE Transactions on Robotics, Dec. 2006, vol. 22, No. 6, pp. 1100-1114.
Eustice et al., "Visually Navigating the RMS Titanic With SLAM Information Filters", Proceedings of Robotics Science and Systems, Jun. 2005, 9 pgs.
Forster et al., "IMU Preintegration on Manifold for Efficient Visual-Inertial Maximum-a-posteriori Estimation", Proceedings of Robotics: Science and Systems, Jul. 2015, 10 pgs.
Forster et al., "SVO: Semi-Direct Visual Odometry for Monocular and Multi-Camera Systems", IEEE Transactions on Robotics, Apr. 2017, vol. 33, No. 2, 18 pgs.
Furgale et al., "Unified temporal and spatial calibration for multi-sensor systems", Proceedings of the IEEE/RSJ International Conference on Intelligent Robots and Systems, Nov. 3-7, 2013, pp. 1280-1286.
Garcia et al., "Augmented State Kalman Filtering for AUV Navigation", Proceedings of the 2002 IEEE International Conference on Robotics & Automation, May 2002, 6 pgs.
George et al., "Inertial Navigation Aided by Monocular Camera Observations of Unknown Features", IEEE International Conference on Robotics and Automation, Roma, Italy, Apr. 10-14, 2007, pp. 3558-3564.
Goldshtein et al., "Seeker Gyro Calibration via Model-Based Fusion of Visual and Inertial Data", 10th International Conference on Information Fusion, 2007, pp. 1-8.
Golub et al., "Matrix Computations, Fourth Edition", The Johns Hopkins University Press, 2013, 780 pp., (Applicant points out, in accordance with JVIPEP 609.04(a), that the year of publication, 2013, is sufficiently earlier than the effective U.S. filing date, so that the particular month of publication is not in issue).
Golub et al., "Matrix Computations, Third Edition", The Johns Hopkins University Press, 2012, 723 pp. (Applicant points out that, in accordance with MPEP 609.04(a), the 2012 year of publication is sufficiently earlier than the effective U.S. filing date and any foreign "continued in misc", priority date of Feb. 21, 2013 so that the particular month of publication is not in issue.).

(56) References Cited

OTHER PUBLICATIONS

Golub et al., "Matrix Multiplication Problems", Chapter 1, Matrix Computations, Third Edition, ISBN 0-8018-5413-X, 1996, (Applicant points out, in accordance with MPEP 609.04(a), that the year of publication "continued in misc", 1996, is sufficiently earlier than the effective U.S. filing date, so that the particular month of publication is not in issue.).
Guivant et al., "Optimization of the Simultaneous Localization and Map-Building Algorithm for Real-Time Implementation", IEEE Transactions on Robotics and Automation,Jun. 2001, vol. 17, No. 3, 16 pgs.
Guo et al., "An Analytical Least-Squares Solution to the Odometer-Camera Extrinsic Calibration Problem", Proceedings of the IEEE International Conference on Robotics and Automation, May 2012, 7 pgs.
Guo et al., "Efficient Visual-Inertial Navigation using a Rolling-Shutter Camera with Inaccurate Timestamps", Proceedings of Robotics: Science and Systems, Jul. 2014, 9 pgs.
Guo et al., "IMU-RGBD camera 3D pose estimation and extrinsic calibration: Observability analysis and consistency improvement", Proceedings of the IEEE International Conference on Robotics and Automation, May 6-10, 2013, pp. 2920-2927.
Guo et al., "IMU-RGBD Camera 3D Pose Estimation and Extrinsic Calibration: Observability Analysis and Consistency Improvement", Proceedings of the IEEE International Conference on Robotics and Automation. May 6-10, 2013, pp. 2935-2942.
Guo et al., "Observability-constrained EKF Implementation of the IMU-RGBD Camera Navigation Using Point and Plane Features", Technical Report, University of Minnesota, Mar. 2013, 6 pgs.
Guo et al., "Resource-Aware Large-Scale Cooperative 3D Mapping from Multiple Cell Phones", Multiple Autonomous Robotic Systems (MARS) Lab, ICRA Poster May 26-31, 2015, 1 pgs.
Gupta et al., "Terrain Based Vehicle Orientation Estimation Combining Vision and Inertial Measurements", Journal of Field Robotics vol. 25, No. 3, 2008, pp. 181-202.
Harris et al., "A combined corner and edge detector", Proceedings of the Alvey Vision Conference, Aug. 31-Sep. 2, 1988, pp. 147-151.
Hermann et al., "Nonlinear Controllability and Observability", IEEE Transactions on Automatic Control, Oct. 1977, vol. AC-22, No. 5, pp. 728-740, doi: 10.1109/TAC.1977.1101601.
Herrera et al., "Joint Depth and Color Camera Calibration with Distortion Correction", IEEE Transactions on Pattern Analysis and Machine Intelligence, Oct. 2012, vol. 34, No. 10, pp. 2058-2064.
Hesch et al., "Consistency analysis and improvement of vision-aided inertial navigation", IEEE Transactions on Robotics, Feb. 2014, vol. 30, No. 1, pp. 158-176.
Hesch et al., "Observability-constrained Vision-aided Inertial Navigation", University of Minnesota, Department of Computer Science and Engineering, MARS Lab, Feb. 2012, 24 pgs.
Hesch et al., "Towards Consistent Vision-aided Inertial Navigation", Proceedings of the 10th International Workshop on the Algorithmic Foundations of Robotics, Jun. 13-15, 2012, 16 pgs.
Heyden et al., "Structure and Motion in 3D and 2D from Hybrid Matching Constraints", 2007, 14 pgs.
Higham, "Matrix Inversion", Chapter 14, Accuracy and Stability of Numerical Algorithms, Second Edition, ISBN 0-89871-521-0, 2002, 29 pp. (Applicant points out, "continued in misc", in accordance with MPEP 609.04(a), that the year of publication, 2002, is sufficiently earlier than the effective U.S. filing date, so that the particular month of publication is not in issue.).
Horn, "Closed-form solution of absolute orientation using unit quaternions", Journal of the Optical Society of America A, vol. 4, Apr. 1987, 14 pgs.
Horn et al., "Closed-form solution of absolute orientation using orthonormal matrices", Journal of the Optical Society of America A, Jul. 1988, vol. 5, No. 7, pp. 1127-1135.
Huang et al., "Observability-based rules for designing consistent EKF slam estimators", International Journal of Robotics Research, Apr. 2010, vol. 29, No. 5, pp. 502-528.
Huang et al., "Visual Odometry and Mapping for Autonomous Flight Using an RGB-D Camera", Proceedings of the International Symposium on Robotics Research, Aug. 28-Sep. 1, 2011, 16 pgs.
Huster et al., "Relative Position Sensing by Fusing Monocular Vision and Inertial Rate Sensors", Stanford University, Department of Electrical Engineering, Dissertation. Jul. 2003, 158 pgs.
Jia et al., "Probabilistic 3-D motion estimation for rolling shutter video rectification from visual and inertial measurements", Proceedings of the IEEE International Workshop on Multimedia Signal Processing, Sep. 2012, pp. 203-208.
Johannsson et al., "Temporally Scalable Visual Slam Using a Reduced Pose Graph", In Proceedings of the IEEE International Conference on Robotics and Automation, May 6-10, 2013, 8 pgs.
Jones et al., "Visual-Inertial Navigation, Mapping and Localization: A Scalable Real-time Causal Approach", International Journal of Robotics Research, Mar. 31, 2011, vol. 30, No. 4, pp. 407-4300.
Julier, "A Sparse Weight Kalman Filter Approach to Simultaneous Localisation and Map Building", Proceedings of the IEEE/RSJ International Conference on Intelligent robots and Systems, Oct. 2001, vol. 3, 6 pgs.
Julier et al., "A Non-divergent Estimation Algorithm in the Presence of Unknown Correlations", Proceedings of the American Control Conference, Jun. 1997, vol. 4, 5 pgs.
Kaess et al., "iSAM: Incremental Smoothing and Mapping", IEEE Transactions on Robotics, Manuscript, Sep. 7, 2008, 14 pgs.
Kaess et al., "iSAM2: Incremental Smoothing and Mapping Using the Bayes Tree", International Journal of Robotics Research, vol. 31, No. 2, Feb. 2012, 19 pgs.
Kelly et al., "A general framework for temporal calibration of multiple proprioceptive and exteroceptive sensors", Proceedings of International Symposium on Experimental Robotics, Dec. 18-21, 2010, 15 pgs.
Kelly et al., "Visual-inertial sensor fusion: Localization, mapping and sensor-to-sensor self-calibration", International Journal of Robotics Research, Jan. 2011, vol. 30, No. 1, pp. 56-79.
Klein et al., "Improving the Agility of Keyframe-Based Slam", ECCV 2008, Part II, LNCS 5303, pp. 802-815.
Klein et al., "Parallel Tracking and Mapping for Small AR Workspaces", Proceedings of the IEEE and ACM International Symposium on Mixed and Augmented Reality, Nov. 13-16, 2007, pp. 225-234.
Kneip et al., "Robust Real-Time Visual Odometry with a Single Camera and an IMU", Proceedings of the British Machine Vision Conference, Aug. 29-Sep. 2, 2011, pp. 16.1-16.11.
Konolige et al., "Efficient Sparse Pose Adjustment for 2D Mapping", Proceedings of the IEEE/RSJ International Conference on Intelligent Robots and Systems, Oct. 18-22, 2010, pp. 22-29.
Konolige et al., "FrameSLAM: from Bundle Adjustment to Real-Time Visual Mapping", IEEE Transactions on Robotics, Oct. 2008, vol. 24, No. 5, pp. 1066-1077.
Konolige et al., "View-based Maps", International Journal of Robotics Research, Jul. 2010, vol. 29, No. 8, pp. 941-957.
Mourikis et al., "A Multi-State Constraint Kalman Filter for Vision-Aided Inertial Navigation", University of Minnesota, Dept. of Computer Science and Engineering, 2006, 20 pgs.
Mourikis et al., "On the Treatment of Relative-Pose Measurements for Mobile Robot Localization", Proceedings of the 2006 IEEE International Conference on Robotics and Automation, May 2006, pp. 2277-2284.
Mourikis et al., "SC-KF Mobile Robot Localization: A Stochastic Cloning Kalman Filter for Processing Relative-State Measurements", IEEE Transactions on Robotics, vol. 23. No. 4, Aug. 2007, pp. 717-730.
Mourikis et al., "Vision-Aided Inertial Navigation for Spacecraft Entry, Descent, and Landing", IEEE Transactions on Robotics, Apr. 2009, vol. 25, No. 2, pp. 264-280.
Mur-Artal et al., "ORB-SLAM: a Versatile and Accurate Monocular SLAM System", IEEE Transactions on Robotics, Oct. 2015, vol. 31, No. 5, 17 pgs.
Mur-Artal et al., "ORB-SLAM2: An Open-Source SLAM System for Monocular, Stereo and RGB-D Cameras", IEEE Transactions on Robotics, Jun. 2017, vol. 33, vol. 5, 9 pgs.

(56) References Cited

OTHER PUBLICATIONS

Mur-Artal et al., "Visual-inertial Monocular SLAM with Map Reuse", IEEE Robotics and Automation Letters, Apr. 2017, vol. 2, No. 2, 8 pgs.
Nerurkar et al., "C-KLAM: Constrained Keyframe-Based Localization and Mapping", Proceedings of the IEEE International Conference on Robotics and Automation, May 31-Jun. 7, 2014, 6 pgs.
Nerurkar et al., "Power-SLAM: A Linear-Complexity, Anytime Algorithm for SLAM", International Journal of Robotics Research, May 2011, vol. 30, No. 6, 13 pgs.
Nister et al., "Scalable Recognition with a Vocabulary Tree", IEEE Computer Vision and Pattern Recognition, 2006, 8 pgs.
Nister et al., "Visual Odometry for Ground Vehicle Applications", Journal of Field Robotics, Jan. 2006, vol. 23, No. 1, 35 pp.
Nocedal et al., "Numerical Optimization", 2nd Ed. Springer, 2006, 683 pp. (Applicant points out, in accordance with MPEP 609.04(a), that the year of publication, 2006, is sufficiently earlier than the effective U.S. filing date, so that the month of publication is not in issue.).
Oliensis, "A New Structure From Motion Ambiguity", IEEE Transactions on Pattern Analysis and Machine Intelligence, Jul. 2000, vol. 22, No. 7, 30 pgs.
Ong et al., "Six DoF Decentralised SLAM", Proceedings of the Australasian Conference on Robotics and Automation, 2003, 10 pp. (Applicant points out, in accordance with MPEP 609.04(a), . . . continued in misc., that the year of publication, 2003, is sufficiently earlier than the effective U.S. filing date, so that the particular month of publication is not in issue.).
Oth et al., "Rolling shutter camera calibration", Proceedings of the IEEE Conference on Computer Vision and Pattern Recognition, Jun. 23-28, 2013, pp. 1360-1367.
Perea et al., "Sliding Windows and Persistence: An Application of Topological Methods to Signal Analysis", Foundations of Computational: Mathematics, Nov. 25, 2013, 34 pgs.
Prazenica et al., "Vision-Based Kalman Filtering for Aircraft State Estimation and Structure From Motion", AIAA Guidance, Navigation, and Control Conference and Exhibit, Aug. 15-18, 2005, 13 pgs.
Qin et al., "VINS-Mono: A Robust and Versatile Monocular Visual-Inertial State Estimator", IEEE Transactions on Robotics, Aug. 2018, vol. 34, No. 4, 17 pgs.
Ragab et al., "EKF Based Pose Estimation Using Two Back-to-Back Stereo Pairs", 14th IEEE International Conference on Image Processing, Sep. 16-19, 2007, 4 pgs.
Randeniya, "Automatic Geo-Referencing By Integrating Camera Vision And Inertial Measurements", University of South Florida, Scholar Commons, Graduate Theses and Dissertations, 2007, 177 pgs.
Rosten et al., "Machine Learning for High-Speed Corner Detection", Proceedings of the 9th European Conference on Computer Vision, May 2006, 14 pgs.
Roumeliotis et al., Prosecution History for U.S. Appl. No. 12/383,371, filed Mar. 23, 2009, issued on Sep. 19, 2017 as U.S. Pat. No. 9,766,074, 608 pgs.
Roumeliotis et al., Prosecution History for U.S. Appl. No. 15/706,149 filed Sep. 15, 2017, issued on Jun. 2, 2020 as U.S. Pat. No. 10,670,404, 268 pgs.
Roumeliotis et al., "Augmenting Inertial Navigation With Image-Based Motion Estimation", IEEE International Conference on Robotics and Automation, 2002, vol. 4, pp. 8 (Applicant points out that, in accordance with MPEP 609.04(a), "continued in misc.", the 2002 year of publication is sufficiently earlier than the effective U.S. filing date and any foreign priority date of Feb. 21, 2013 so that the particular month of publication is not in issue.).
Roumeliotis et al., "Stochastic Cloning: A Generalized Framework for Processing Relative State Measurements", Proceedings of the 2012 IEEE International Conference on Robotics and Automation, May 11-15, 2002, pp. 1788-1795.
Rublee et al., "ORB: An efficient alternative to SIFT or SURF", 2011 International Conference on Computer Vision, Nov. 6-13, 2011, Barcelona, Spain, pp. 2564-2571, DOI: 10.1109/ICCV.2011. 6126544.
Schmid et al., "Automatic Line Matching Across Views", Proceedings of the IEEE Computer Science Conference on Computer Vision and Pattern Recognition, Jun. 17-19, 1997, pp. 666-671.
Se et al., "Visual Motion Estimation and Terrain Modeling for Planetary Rovers", International Symposium on Artificial Intelligence for Robotics and Automation in Space, Munich, Germany, Sep. 2005, 8 pgs.
Servant et al., "Improving Monocular Plane-based SLAM with Inertial Measurements", 2010 IEEE/RSJ International Conference on Intelligent Robots and Systems, Oct. 18-22, 2010, pp. 3810-3815.
Shoemake et al., "Animating rotation with quaternion curves", ACM SIGGRAPH Computer Graphics, Jul. 22-26, 1985, vol. 19, No. 3, pp. 245-254.
Sibley et al., "Sliding Window Filter with Application to Planetary Landing", Journal of Field Robotics, Sep./Oct. 2010, vol. 27, No. 5, pp. 587-608.
Smith et al., "On the Representation and Estimation of Spatial Uncertainty", International Journal of Robotics Research, 1986, vol. 5, No. 4, pp. 56-68 (Applicant points out that, in accordance with MPEP 609.04(a), the 1986 year "continued in misc", of publication is sufficiently earlier than the effective U.S. filing date and any foreign priority date of Feb. 21, 2013 so that the particular month of publication is not in issue.).
Smith et al., "Real-time Monocular Slam with Straight Lines", British Machine Vision Conference, Sep. 2006, vol. 1, pp. 17-26.
Soatto et al., "Motion Estimation via Dynamic Vision", IEEE Transactions on Automatic Control, vol. 41, No. 3, Mar. 1996, pp. 393-413.
Soatto et al., "Recursive 3-D Visual Motion Estimation Using Subspace Constraints", International Journal of Computer Vision, Mar. 1997, vol. 22, No. 3, pp. 235-259.
Spetsakis et al., "Structure from Motion Using Line Correspondences", International Journal of Computer Vision, Jun. 1990, vol. 4, No. 3, pp. 171-183.
Strelow, "Motion Estimation From Image and Inertial Measurements", Carnegie Mellon University, School of Computer Science, Dissertation, Nov. 2004, CMU-CS-04-178, 164 pgs.
Sturm, "Tracking and Mapping in Project Tango", Project Tango, accessed from https://jsturm.de/publications/data/sturm2015_dagstuhl. pdf accessed on Jun. 1, 2021, published 2015, (Applicant points out, in accordance with MPEP 509.04(a), that the year of publication, 2015, is sufficiently earlier than the effective U.S. filing dale, so that the particular month of publication is not in issue.), 29 pgs.
Taylor et al., "Parameterless Automatic Extrinsic Calibration of Vehicle Mounted Lidar-Camera Systems", Conference Paper, Mar. 2014, 3 pgs.
Taylor et al., "Structure and Motion from Line Segments in Multiple Images", IEEE Transactions on Pattern Analysis and Machine Intelligence, Nov. 1995, vol. 17, No. 11, pp. 1021-1032.
Thorton et al., "Triangular Covariance Factorizations for Kalman Filtering", Technical Memorandum 33-798, National Aeronautics and Space Administration, Oct. 15, 1976, 212 pgs.
Thrun et al., "The Graph SLAM Algorithm with Applications to Large-Scale Mapping of Urban Structures", The International Journal of Robotics Research, May 2006, vol. 25, No. 5-6, pp. 403-429.
Torr et al., "Robust Parameterization and Computation of the Trifocal Tensor", Image and Vision Computing, vol. 15, No. 8, Aug. 1997, 25 pgs.
Trawny et al., "Indirect Kalman Filter for 3D Attitude Estimation", University of Minnesota, Department of Computer Science & Engineering, MARS Lab, Mar. 2005, 25 pgs.
Trawny et al., "Vision-Aided Inertial Navigation for Pin-Point Landing using Observations of Mapped Landmarks", Journal of Field Robotics, vol. 24, No. 5, May 2007, pp. 357-378.
Triggs et al., "Bundle Adjustment—A Modern Synthesis", Vision Algorithms: Theory & Practice, Apr. 12, 2002, LNCS 1883, 71 pgs.

(56) References Cited

OTHER PUBLICATIONS

Triggs et al., "Bundle Adjustment—A Modern Synthesis", Proceedings of the International Workshop on Vision Algorithms: Theory and Practice, Lecture Notes in Computer Science, Sep. 21-22, 1999, vol. 1883, pp. 298-372.

Weiss et al., "Real-time Metric State Estimation for Modular Vision-inertial Systems", IEEE International Conference on Robotics and Automation, May 9-13, 2011, pp. 4531-4537.

Weiss et al., "Real-time Onboard Visual-Inertial State Estimation and Self-Calibration of MAVs in Unknown Environments", IEEE International Conference on Robotics and Automation, May 14-18, 2012, pp. 957-964.

Weiss et al., "Versatile Distributed Pose Estimation and sensor Self-Calibration for an Autonomous MAV", IEEE International Conference on Robotics and Automations, May 14-18, 2012, pp. 31-38.

Weng et al., "Motion and Structure from Line Correspondences: Closed-Form Solution, Uniqueness, and Optimization", IEEE Transactions on Pattern Analysis and Machine Intelligence, Mar. 1992, vol. 14, No. 3, pp. 318-336.

Williams et al., "Feature and Pose Constrained Visual Aided Inertial Navigation for Computationally Constrained Aerial Vehicles", IEEE International Conference on Robotics and Automation, May 9-13, 2011, pp. 431-438.

Wu et al., "A Square Root Inverse Filter for Efficient Vision-aided Inertial Navigation on Mobile Devices", Proceedings of Robotics: Science and Systems, Jul. 2015, 9 pgs.

Yu, "Model-less Pose Tracking", The Chinese University of Hong Kong, Thesis Submitted for the Degree of Doctor of Philosophy, dated Jul. 2007, 153 pgs.

Yu et al., "Controlling Virtual Cameras Based on a Robust Model-Free Pose Acquisition Technique", IEEE Transactions on Multimedia, No. 1, 2009, pp. 184-190.

Zhou et al., "Determining 3D Relative Transformations for Any Combination of Range and Bearing Measurements", IEEE Transactions o Robotics, Apr. 2013, vol. 29, No. 2, pp. 458-474.

Kottas et al., "A Resource-aware Vision-aided Inertial Navigation System for Wearable and Portable Computers", IEEE International Conference on Robotics and Automation, Accepted Apr. 18, 2014, available online May 6, 2014, 3 pp.

Kottas et al., "An Iterative Kalman Smoother for Robust 3D Localization and mapping", ISRR, Tech Report, Oct. 16, 2014, 15 pp.

Kottas et al., "An iterative Kalman smoother for robust 3D localization on mobile and wearable devices", Proceedings of the IEEE International Conference on Robotics and Automation, May 26-30, 2015, pp. 6336-6343.

Kottas et al., "An Iterative Kalman Smoother for Robust 3D Localization on Mobile and Wearable devices", Submitted confidentially to International Conference on Robotics & Automation, ICRA, 15, May 5, 2015, 8 pp.

Kottas et al., "Detecting and dealing with hovering maneuvers in vision-aided inertial navigation systems", Proceedings of the IEEE/RSJ International Conference on Intelligent Robots and Systems, Nov. 3-7, 2013, pp. 3172-3179.

Kottas et al., "Efficient and Consistent Vision-aided Inertial Navigation using Line Observations", Department of Computer Science & Engineering, University of Minnesota, MARS Lab, Sep. 2012, TR-2012-002, 14 pp.

Kottas et al., "On the Consistency of Vision-aided Inertial Navigation", Proceedings of the International Symposium on Experimental Robotics, Jun. 17-20, 2012, 15 pp.

Kummerle et al., "g2o: A General Framework for Graph Optimization", In Proceedings of the IEEE International Conference on Robotics and Automation, May 9-13, 2011, pp. 3607-3613.

Langelaan, "State Estimation for Autonomous Flight in Cluttered Environments", Stanford University, Department of Aeronautics and Astronautics, Dissertation, Mar. 2006, 128 pp.

Latif et al., "Applying Sparse '1-Optimization to Problems in Robotics", ICRA 2014 Workshop on Long Term Autonomy, Jun. 2014, 3 pp.

Lee et al., "Pose Graph-Based RGB-D SLAM in Low Dynamic Environments", ICRA Workshop on Long Term Autonomy, 2014, 19 pp.

Leutenegger et al., "Keyframe-based visual-inertial odometry using nonlinear optimization", The International Journal of Robotics Research, Mar. 2015, vol. 34, No. 3, pp. 1-21, DOI: 10.1177/0278364914554813.

Li et al, "High-Precision, Consistent EKF-based Visual-Inertial Odometry", International Journal of Robotics Research, May 2013, vol. 32, No. 6, 33 pp, DOI: 10.1177/0278364913481251.

Li et al., "3-D motion estimation and online temporal calibration for camera-IMU systems", Proceedings of the IEEE International Conference on Robotics and Automation, May 6-10, 2013, 8 pgs.

Li et al., "Improving the Accuracy of EKF-based Visual-Inertial Odometry", IEEE International Conference on Robotics and Automation, May 14-18, 2012, 8 pgs.

Li et al., "Optimization-Based Estimator Design for Vision-Aided Inertial Navigation", Proceedings of the Robotics: Science and Systems Conference, Jul. 9-13, 2012, 8 pp.

Li et al., "Real-time Motion Tracking on a Cellphone using Inertial Sensing and a Rolling-Shutter Camera", 2013 IEEE International Conference on Robotics and Automation (ICRA), May 6-10, 2013, 8 pp.

Li et al., "Vision-aided inertial navigation with rolling-shutter cameras", The International Journal of Robotics Research, retrieved from ijr.sagepub.com on May 22, 2015, 18 pp.

Lim et al., "Zero-Configuration Indoor Localization over IEEE 802.11 Wireless Infrastructure", Jun. 23, 2008, 31 pp.

Liu et al., "Estimation of Rigid Body Motion Using Straight Line Correspondences", Computer Vision, Graphics, and Image Processing, Jul. 1988, vol. 43, No. 1, pp. 37-52.

Liu et al., "ICE-BA: Incremental, Consistent and Efficient Bundle Adjustment for Visual-Inertial SLAM", Proceedings of the IEEE Conference on Computer Vision and Pattern Recognition, Jun. 2018, pp. 1974-1982.

Liu et al., "Multi-aided inertial navigation for ground vehicles in outdoor uneven environments", Proceedings of the IEEE International Conference on Robotics and Automation, Apr. 18-22, 2005, pp. 4703-4708.

Lowe, "Distinctive Image Features from Scale-Invariant Keypoints", Retrieved from: https://www.robots.ox.ac.uk/~vgg/research/affine/det_eval_files/lowe_ijcv2004.pdf, Jan. 5, 2004, Accepted for publication in the International Journal of Computer Vision, 2004, 28 pgs.

Lucas et al., "An iterative image registration technique with an application to stereo vision", Proceedings of 7th the International Joint Conference on Artificial Intelligence, 1981, pp. 121-130.

Lupton et al., "Visual-Inertial-Aided Navigation for High-Dynamic Motion in Built Environments Without Initial Conditions", IEEE Transactions on Robotics, Feb. 2012, vol. 28, No. 1, pp. 61-76, 10.1109/TRO.2011.2170332.

Lynen et al., "Get Out of My Lab: Large-scale, Real-Time Visual-Inertial Localization", Proceedings of robotics: Science and Systems, Jul. 2015, 10 pp.

Martinelli, "Closed-form Solution of Visual-inertial structure from Motion", International Journal of Computer Vision, Jan. 2014, vol. 106, No. 2, 16 pp.

Martinelli, "Vision and IMU Data Fusion: Closed-form Solutions for Attitude, Speed, Absolute Scale, and Bias Determination", IEEE Transactions on Robotics, Feb. 2012, vol. 28, No. 1, pp. 44-60, DOI: 10.1109/TRO.2011.2160468.

Matas et al., "Robust Detection of Lines Using the Progressive Probabilistic Hough Transformation", Computer Vision and Image Understanding, Apr. 2000, vol. 78, No. 1, pp. 119-137, doi:10.1006.cviu.1999.0831.

Maybeck, "Stochastic models, estimation and control", Academy Press, May 28, 1979, vol. 1, Chapter 1,19 pp.

(56) References Cited

OTHER PUBLICATIONS

McLauchlan, "The Variable State Dimension Filter Applied to Surface-Based Structure From Motion CVSSP Technical Report VSSP-TR-4/99", University of Surrey, Department of Electrical Engineering, Dec. 1999, 52 pp.

Meltzer et al., "Edge Descriptors for Robust Wide-baseline Correspondence", IEEE Conference on Computer Vision and Pattern Recognition, Jun. 23-28, 2008, pp. 1-8.

Mirzaei et al., "A Kalman Filter-Based Algorithm for IMU-Camera Calibration: Observability Analysis and Performance Evaluation", IEEE Transactions on Robotics, Oct. 2008, vol. 24, No. 5, pp. 1143-1156, doi: 10.1006.cviu.1999.0831.

Mirzaei et al., "Globally Optimal Pose Estimation from Line Correspondences", IEEE International Conference on Robotics and Automation, May 9-13, 2011, pp. 5581-5588.

Mirzaei et al., "Optimal Estimation of Vanishing Points in a Manhattan World", IEEE International Conference on Computer Vision, Nov. 6-13, 2011, pp. 2454-2461.

Montiel et al., "Unified Inverse Depth Parametrization for Monocular SLAM", Proceedings of Robotics: Science and Systems II (RSS-06), Aug. 16-19, 2006, 8 pp.

Mourikis et al., "A Dual-Layer Estimator Architecture for Long-term Localization", Proceedings of the Workshop on Visual Localization for Mobile Platforms, Jun. 24-26, 2008, 8 pp.

Mourikis et al., "A Multi-State Constraint Kalman Filter for Vision-aided Inertial Navigation", IEEE International Conference on Robotics and Automation, Apr. 10-14, 2007, pp. 3565-3572.

Mourikis et al., "A Multi-State Constraint Kalman Filter for Vision-aided Inertial Navigation", IEEE International Conference on Robotics and Automation, Sep. 28, 2006, 20 pp.

Mourikis et al., "A Multi-State Constraint Kalman Filter for Vision-Aided Inertial Navigation", University of Minnesota, Dept. of Computer Science and Engineering, 2006, 20 pages.

\* cited by examiner

VISION-AIDED INERTIAL NAVIGATION

CROSS-REFERENCE TO RELATED APPLICATIONS

This application is a continuation of U.S. patent application Ser. No. 17/457,022, filed on Nov. 30, 2021 and entitled "VISION-AIDED INERTIAL NAVIGATION,", which is a continuation of U.S. patent application Ser. No. 16/871,560, filed on May 11, 2020 and entitled "VISION-AIDED INERTIAL NAVIGATION," which is a continuation of U.S. patent application Ser. No. 15/706,149, filed on Sep. 15, 2017 and entitled "EXTENDED KALMAN FILTER FOR 3D LOCALIZATION AND VISION-AIDED INERTIAL NAVIGATION," which is a continuation of U.S. patent application Ser. No. 12/383,371, filed on Mar. 23, 2009 and entitled "VISION-AIDED INERTIAL NAVIGATION," which claims the benefit of Provisional U.S. Patent Application No. 61/040,473, filed Mar. 28, 2008 and entitled "VISION-AIDED INERTIAL NAVIGATION," the disclosures of which are incorporated herein by reference in their entireties.

STATEMENT OF GOVERNMENT RIGHTS

This invention was made with Government support under Grant Number MTP-1263201 awarded by the NASA Mars Technology Program, and support under Grant Number EIA-0324864, IIS-0643680 awarded by the National Science Foundation. The Government has certain rights in this invention.

TECHNICAL FIELD

This document pertains generally to navigation, and more particularly, but not by way of limitation, to vision-aided inertial navigation.

BACKGROUND

Existing technologies for navigation are not without shortcomings. For example, global positioning system (GPS) based navigation systems require good signal reception from satellites in orbit. With a GPS-based system, navigation in urban areas and indoor navigation is sometimes compromised because of poor signal reception. In addition, GPS-based systems are unable to provide close-quarter navigation for vehicular accident avoidance. Other navigation systems suffer from sensor errors (arising from slippage, for example) and an inability to detect humans or other obstacles.

Overview

This document discloses a system for processing visual information from a camera, for example, and inertial sensor data to provide an estimate of pose or other localization information. The camera provides data including images having a number of features visible in the environment and the inertial sensor provides data with respect to detected motion. A processor executes an algorithm to combine the camera data and the inertial sensor data to determine position, orientation, speed, acceleration or other higher order derivative information.

A number of features within the environment are tracked. The tracked features correlate with relative movement as to the frame of reference with respect to the environment. As the number of features increases, the complexity of the data processing also rises. One example of the present subject matter uses an Extended Kalman filter (EKF) having a computational complexity that varies linearly with the number of tracked features.

In one example, a first sensor provides data for tracking the environmental features and a second sensor provides data corresponding to movement of the frame of reference with respect to the environment. A first sensor can include a camera and a second sensor can include an inertial sensor.

Other types of sensors can also be used. Each sensor can be classified as a motion sensor or as a motion inferring sensor. One example of a sensor that directly detects motion is a Doppler radar system and an example of a sensor that detects a parameter from which motion can be inferred is a camera.

In one example, a single sensor provides data corresponding to the tracked features as well as data corresponding to relative movement of the frame of reference within the environment. Data from the single sensor can be multiplexed in time, in space, or in another parameter.

The sensors can be located on (or coupled to), either or both of the frame of reference and the environment. Relative movement as to the frame of reference and the environment can occur by virtue of movement of the frame of reference within a stationary environment or it can occur by virtue of a stationary frame of reference and a traveling environment.

Data provided by the at least one sensor is processed using a processor that implements a filter algorithm. The filter algorithm, in one example, includes an EKF, however, other filters are also contemplated.

In one example, a system includes a feature tracker, a motion sensor and a processor. The feature tracker is configured to provide feature data for a plurality of features relative to a frame of reference in an environment for a period of time. The motion sensor is configured to provide motion data for navigation of the frame of reference in the environment for the period of time. The processor is communicatively coupled to the feature tracker and communicatively coupled to the motion sensor. The processor is configured to generate at least one of navigation information for the frame of reference and the processor is configured to carry out the estimation at a computational complexity linear with the number of tracked features. Linear computational complexity is attained by simultaneously using each feature's measurements to impose constraints between the poses from which the feature was observed. This is implemented by manipulating the residual of the feature measurements to remove the effects of the feature estimate error (either exactly or to a good approximation).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
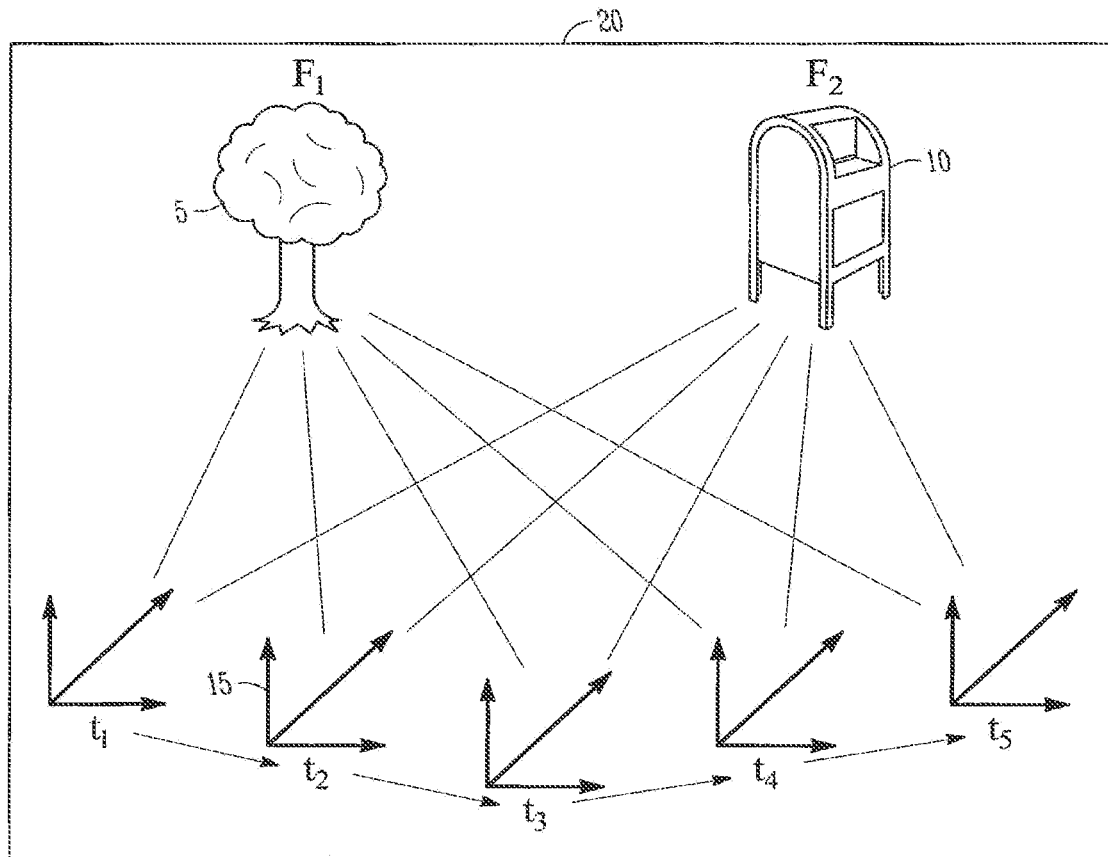
FIG. 1 illustrates a composite view of time sampled travel of a frame of reference relative to an environment.

FIG. 1 illustrates a composite view of five time-sampled positions during travel of frame of reference 15 within environment 20. Environment 20 includes two features illustrated here as a tree and a U.S. postal mailbox, denoted as feature 5 and feature 10, respectively. At each of the time sampled points, each of the two features are observed as denoted in the figure. For example, at time $t_1$, frame of reference 15 observes feature 5 and feature 10 along the line segments illustrated. At a later time $t_2$, frame of reference 15 again observes feature 5 and feature 10, but with a different perspective. In the figure, the frame of reference travels a curving path in view of the features.

Navigation information as to the relative movement between the frame of reference 15 and the environment 20 can be characterized using sensor data.

Various types of sensors can be identified. A first type of sensor provides direct measurement of quantities related to motion. Data from a sensor of a second type can provide data by which motion can be inferred. Data can also be derived form a statistical model of motion.

A sensor of the first type provides an output that is derived from direct measurement of the motion. For example, a wheel encoder provides data based on rotation of the wheel. Other examples include a speedometer, a Doppler radar, a gyroscope, an accelerometer, an airspeed sensor (such as pitot tube), and a global positioning system (GPS).

A motion inferring sensor provide an output that, after processing, allows an inference of motion. For example, a sequence of camera images can be analyzed to infer relative motion. In addition to a camera (single or multiple), other examples of motion-inferring sensors include a laser scanner (either 2D or 3D), sonar, and radar.

In addition to receiving data from a motion sensor and a motion-inferring sensor, data can also be derived from a statistical probabilistic model of motion. For example, a pattern of vehicle motion through a roadway intersection can provide data for the present subject matter. Additionally, various types of kinematic or dynamic models can be used to describe the motion.

With reference again to FIG. 1, an estimate of the motion of frame of reference 15 at each of the time samples can be generated using an inertial measurement unit (IMU).

In addition, feature 5 and feature 10 can be tracked using a video camera.

Figure 2:
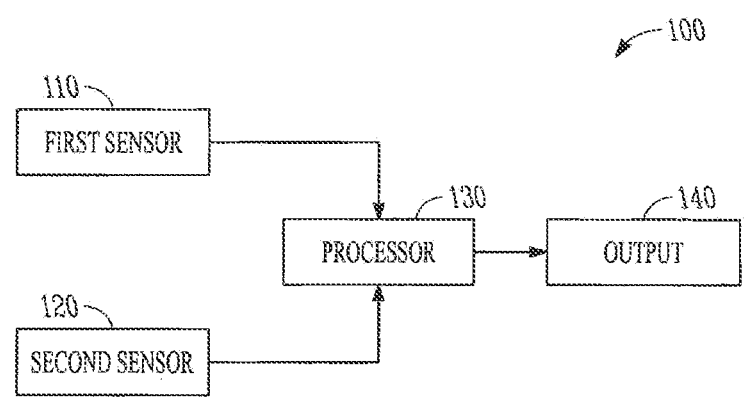
FIG. 2 illustrates a block diagram of a system.
Figure 3A:
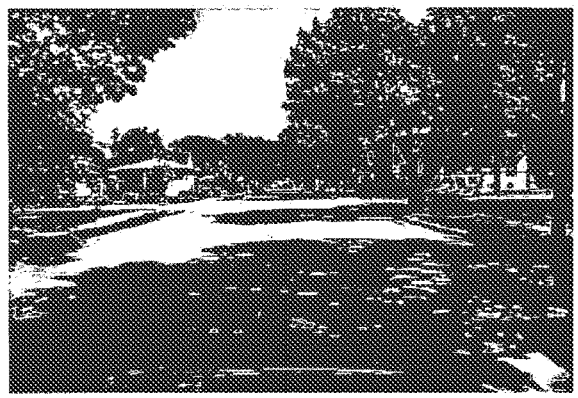
FIGS. 3A-3D illustrates selected images from a dataset.
Figure 3B:
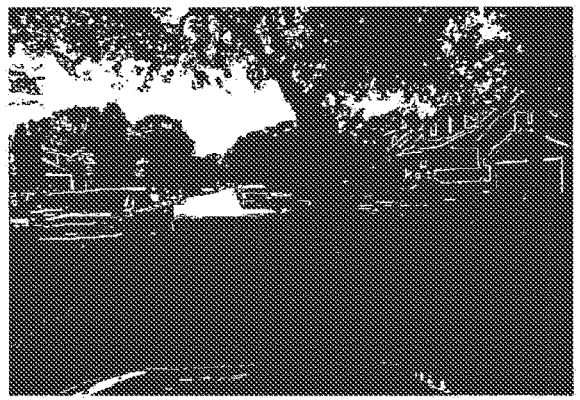
Figure 3C:
Figure 3D:

FIG. 2 illustrates system 100 according to one example of the present subject matter. System 100 includes first sensor 110 and second sensor 120. In one example, sensor 100 includes a feature tracker and sensor 120 includes a motion sensor, a motion inferring sensor, or a motion tracking model. The figure illustrates two sensors, however, these can be combined and implemented as a single sensor, such as for example, a camera or a radar system, in which the function of sensing motion and tracking features are divided in time, space, or other parameter. In addition, more than two sensors can be provided.

System 100 uses data derived from two sensing modalities which are represented in the figure as first sensor 110 and second sensor 120. The first sensing modality entails detecting motion of the frame of reference with respect to the environment. The first sensing modality expresses a constraint as to consecutive poses and a motion measurement. This motion can be sensed using a direct motion sensor, a motion tracking sensor, a motion inferring sensor or based on feature observations. The second sensing modality includes feature observations and is a function of a particular feature and a particular pose.

System 100 includes processor 130 configured to receive data from the one or more sensors. Processor 130, in one example, includes instructions for implementing an algorithm to process the data and derive navigation information. Processor 130, in one example, implements a filter algorithm, such as a Kalman filter or an extended Kalman filter (EKF).

Data acquired using the feature tracking sensor and a motion sensor (or motion-inferring sensor or a motion tracking model) is processed by an algorithm. The algorithm has complexity linear with the number of tracked features. Linear complexity means that complexity of the calculation doubles with a doubling of the number of features that are tracked. In order to obtain linear complexity, the algorithm uses feature measurements for imposing constraints between the poses. This is achieved by projecting the residual equation of the filter to remove dependency of the residual on the feature error or higher order terms.

Processor 130 provides an output to output device 140. Output device 140, in various examples, includes a memory or other storage device, a visible display, a printer, an actuator (configured to manipulate a hardware device), and a controller (configured to control another system).

A number of output results are contemplated. For example, the algorithm can be configured to determine a position of a particular feature. The feature is among those tracked by one of the sensors and its position is described as a point in three-dimensional space. The results can include navigation information for the frame of reference. For example, a position, attitude, orientation, velocity, acceleration or other higher order derivative with respect to time can be calculated. In one example, the results include the pose for the frame of reference. The pose includes a description of position and attitude. Orientation refers to a single degree of freedom and is commonly referred to as heading. Attitude, on the other hand, includes the three dimensions of roll, pitch and yaw.

The output can include a position, an orientation, a velocity (linear or rotational), acceleration (linear or rotational) or a higher order derivative of position with respect to time.

The output can be of any dimension, including 1-dimensional, 2-dimensional or 3-dimensional.

The frame of reference can include, for example, an automobile, a vehicle, or a pedestrian. The sensors are in communication with a processor, as shown in FIG. 2, and provide data relative to the frame of reference. For example, a particular sensor can have multiple components with one portion affixed to the frame of reference and another portion affixed to the environment.

In other examples, a portion of a sensor is decoupled from the frame of reference and provides data to a remote processor.

In one example, a feature in space describes a particular point, and thus, its position within an environment can be identified using three degrees of freedom. In contrast to a feature, the frame of reference can be viewed as a rigid body having six degrees of freedom. In particular, the degrees of freedom for a frame of reference can be described as moving up and down, moving left and right, moving forward and backward, tilting up and down (pitch), turning left and right (yaw), and tilting side to side (roll).

Consider next an example of an Extended Kalman Filter (EKF)-based algorithm for real-time vision-aided inertial navigation. This example includes derivation of a measurement model that is able to express the geometric constraints that arise when a static feature is observed from multiple camera poses. This measurement model does not require including the 3D feature position in the state vector of the EKF and is optimal, up to linearization errors. The vision-aided inertial navigation algorithm has computational complexity that is linear in the number of features, and is capable of high-precision pose estimation in large-scale real-world environments. The performance of the algorithm can be demonstrated with experimental results involving a camera/IMU system localizing within an urban area.

Introduction

Vision-aided inertial navigation has benefited from recent advances in the manufacturing of MEMS-based inertial sensors. Such sensors have enabled small, inexpensive, and very accurate Inertial Measurement Units (IMUs), suitable for pose estimation in small-scale systems such as mobile robots and unmanned aerial vehicles. These systems often operate in urban environments where GPS signals are unreliable (the "urban canyon"), as well as indoors, in space, and in several other environments where global position measurements are unavailable.

Visual sensing provides images with high-dimensional measurements, and having rich information content. A feature extraction method can be used to detect and track hundreds of features in images. However, the high volume of data also poses a significant challenge for estimation algorithm design. When real-time localization performance is required, there is a fundamental trade-off between the computational complexity of an algorithm and the resulting estimation accuracy.

The present algorithm can be configured to optimally utilize the localization information provided by multiple measurements of visual features. When a static feature is viewed from several camera poses, it is possible to define geometric constraints involving all these poses. This document describes a model for expressing these constraints without including the 3D feature position in the filter state vector, resulting in computational complexity only linear in the number of features.

The Simultaneous Localization and Mapping (SLAM) paradigm refers to a family of algorithms for fusing inertial measurements with visual feature observations. In these methods, the current IMU pose, as well as the 3D positions of all visual landmarks are jointly estimated. These approaches share the same basic principles with SLAM-based methods for camera-only localization, with the difference that IMU measurements, instead of a statistical motion model, are used for state propagation. SLAM-based algorithms account for the correlations that exist between the pose of the camera and the 3D positions of the observed features. SLAM-based algorithms, on the other hand, suffer high computational complexity; properly treating these correlations is computationally costly, and thus performing vision-based SLAM in environments with thousands of features remains a challenging problem.

The present subject matter includes an algorithm that expresses constraints between multiple camera poses, and thus attains higher estimation accuracy, in cases where the same feature is visible in more than two images.

The multi-state constraint filter of the present subject matter exploits the benefits of delayed linearization while having complexity only linear in the number of features. By directly expressing the geometric constraints between multiple camera poses it avoids the computational burden and loss of information associated with pairwise displacement estimation. Moreover, in contrast to SLAM-type approaches, it does not require the inclusion of the 3D feature positions in the filter state vector, but still attains optimal pose estimation.

Estimator Description

A goal of the proposed EKF-based estimator is to track the 3D pose of the IMU-affixed frame {I} with respect to a global frame of reference {G}. In order to simplify the treatment of the effects of the earth's rotation on the IMU measurements (cf. Equations 7 and 8), the global frame is chosen as an Earth-Centered, Earth-Fixed (ECEF) frame. An overview of the algorithm is given in Table 1.

TABLE 1

Multi-State Constraint Filter

| | |
|---|---|
| Propagation | for each IMU measurement received, propagate the filter state and covariance. |
| Image registration | Every time a new image is recorded: augment the state and covariance matrix with a copy of the current camera pose estimate; and image processing module begins operation. |
| Update | when the feature measurements of a given image become available, perform an EKF update. |

The IMU measurements are processed immediately as they become available, for propagating the EKF state and covariance. On the other hand, each time an image is recorded, the current camera pose estimate is appended to the state vector. State augmentation is used for processing the feature measurements, since during EKF updates the measurements of each tracked feature are employed for imposing constraints between all camera poses from which the feature was seen. Therefore, at any time instant the EKF state vector comprises (i) the evolving IMU state, $X_{IMU}$, and (ii) a history of up to $N_{max}$ past poses of the camera. The various components of the algorithm are described in detail below.

A. Structure of the EKF State Vector

The evolving IMU state is described by the vector:

$$X_{IMU} = \begin{bmatrix} {}_G^I\bar{q}^T & b_g^T & {}^Gv_I^T & b_a^T & {}^Gp_I^T \end{bmatrix}^T \quad \text{(Equation 1)}$$

where ${}_G^I\bar{q}$ is the unit quaternion describing the rotation from frame {G} to frame a {I}, ${}^Gp_I$ and ${}^Gv_I$ are the IMU position and velocity with respect to {G}, and $b_g$ and $b_a$ are 3×1 vectors that describe the biases affecting the gyroscope and accelerometer measurements, respectively. The IMU biases are modeled as random walk processes, driven by the white Gaussian noise vectors $n_{wg}$ and $n_{wa}$, respectively. Following Eq. (1), the IMU error-state is defined as:

$$\tilde{X}_{IMU} = \begin{bmatrix} \delta\theta_I^T & \tilde{b}_g^T & {}^G\tilde{v}_I^T & \tilde{b}_a^T & {}^G\tilde{p}_I^T \end{bmatrix}^T \quad \text{(Equation 2)}$$

For the position, velocity, and biases, the standard additive error definition is used (i.e., the error in the estimate $\hat{x}$ of a quantity x is defined as $\tilde{x}=x-\hat{x}$). However, for the quaternion a different error definition is employed. In particular, if $\hat{\bar{q}}$ is the estimated value of the quaternion $\bar{q}$, then the orientation error is described by the error quaternion $\delta \bar{q}$, which is defined by the relation $\bar{q}=\delta\bar{q} \otimes \hat{\bar{q}}$ In this expression, the symbol $\otimes$ denotes quaternion multiplication. The error quaternion is $$\delta \bar{q} \simeq \begin{bmatrix} \frac{1}{2}\delta\theta^T & 1 \end{bmatrix}^T \quad \text{(Equation 3)}$$

Intuitively, the quaternion $\delta \bar{q}$ describes the (small) rotation that causes the true and estimated attitude to coincide. Since attitude corresponds to 3 degrees of freedom, using $\delta\theta$ to describe the attitude errors is a minimal representation.

Assuming that N camera poses are included in the EKF state vector at time-step k, this vector has the following form:

$$\hat{X}_k = \begin{bmatrix} \hat{X}_{IMU_k}^T & {}_G^{C_1}\hat{\bar{q}}^T & {}^G\hat{p}_{C_1}^T & \dots & {}_G^{C_N}\hat{\bar{q}}^T & {}^G\hat{p}_{C_N}^T \end{bmatrix}^T \quad \text{(Equation 4)}$$

Where ${}_G^{C_i}\hat{\bar{q}}$ and ${}^G\hat{p}_{C_i}$, $i=1 \dots N$ are the estimates of the camera attitude and position, respectively. The EKF error-state vector is defined accordingly:

$$\tilde{X}_k = \begin{bmatrix} \tilde{X}_{IMU_k}^T & \delta\theta_{C_1}^T & {}^G\tilde{p}_{C_1}^T & \dots & \delta\theta_{C_N}^T & \delta\theta_{C_N}^T \end{bmatrix}^T \quad \text{(Equation 5)}$$

B. Propagation

The filter propagation equations are derived by discretization of the continuous-time IMU system model, as described in the following:

1) Continuous-Time System Modeling

The time evolution of the IMU state is described by:

$$\begin{aligned} {}_G^I \dot{\bar{q}}(t) &= \frac{1}{2}\Omega(\omega(t)){}_G^I\bar{q}(t), \quad \dot{b}_g(t) = n_{wg}(t) \\ {}^G\dot{v}(t) &= {}^Ga(t), \quad \dot{b}_a(t) = n_{wa}(t), \quad {}^G\dot{p}_I(t) = {}^Gv_I(t) \end{aligned} \quad \text{(Equation 6)}$$

In these expressions, ${}^Ga$ is the body acceleration in the global frame, $\omega = [\omega_x \ \omega_y \ \omega_z]^T$ the rotational velocity expressed in the IMU frame, and $$\Omega(\omega) = \begin{bmatrix} -[\omega \times] & \omega \\ -\omega^T & 0 \end{bmatrix}, \quad [\omega \times] = \begin{bmatrix} 0 & -\omega_z & \omega_y \\ \omega_z & 0 & -\omega_x \\ -\omega_y & \omega_x & 0 \end{bmatrix}$$

The gyroscope and accelerometer measurements, $\omega_m$ and $a_m$ respectively, are given by:

$$\omega_m = \omega + C({}_G^I\bar{q})\omega_G + b_g + n_g \quad \text{(Equation 7)}$$

$$a_m = C({}_G^I\bar{q})({}^Ga - {}^Gg + 2[\omega_G \times]{}^Gv_I + [\omega_G \times]^2{}^Gp_I) + b_a + n_a \quad \text{(Equation 8)}$$

where $C(\cdot)$ denotes a rotational matrix, and $n_g$ and $n_a$ are zero-mean, white Gaussian noise processes modeling the measurement noise. Note that the IMU measurements incorporate the effects of the planet's rotation, $\omega_G$. Moreover, the accelerometer measurements include the gravitational acceleration, $G_G$, expressed in the local frame.

Applying the expectation operator in the state propagation equations (Equation 6) yields the equations for propagating the estimates of the evolving IMU state:

$$\begin{aligned} {}_G^I\dot{\hat{\bar{q}}} &= \frac{1}{2}\Omega(\hat{\omega}){}_G^I\hat{\bar{q}}, \quad \dot{\hat{b}}_g = 0_{3\times 1}, \\ {}^G\dot{\hat{v}}_I &= C_{\hat{q}}^T\hat{a} - 2[\omega_G \times]{}^G\hat{v}_I + [\omega_G \times]^{2G}\hat{p}_I + {}^Gg \\ \dot{\hat{b}}_a &= 0_{3\times 1}, \quad {}^G\dot{\hat{p}}_I = {}^G\hat{v}_I \end{aligned} \quad \text{(Equation 9)}$$

where, for brevity, denote $C_{\hat{q}}=C({}_G^I\hat{\bar{q}})$, $\hat{a}=a_m-\hat{b}_a$ and $\hat{\omega}=\omega_m-\hat{b}_g-C_{\hat{q}}\omega_G$. The linearized continuous-time model for the IMU error-state is:

$$\dot{\tilde{X}}_{IMU} = F\tilde{X}_{IMU} + Gn_{IMU} \quad \text{(Equation 10)}$$

where $n_{IMU}=[n_g^T \ n_{wg}^T \ n_a^T \ n_{wa}^T]^T$ is the system noise. The covariance matrix of $n_{IMU}$, $Q_{IMU}$, depends on the IMU noise characteristics and is computed off-line during sensor calibration. The matrices F and G that appear in Equation 10 are given by:

$$F = \begin{bmatrix} -[\hat{\omega}\times] & -I_3 & 0_{3\times 3} & 0_{3\times 3} & 0_{3\times 3} \\ 0_{3\times 3} & 0_{3\times 3} & 0_{3\times 3} & 0_{3\times 3} & 0_{3\times 3} \\ -C_{\hat{q}}^T[\hat{a}\times] & 0_{3\times 3} & -2[\omega_G\times] & -C_{\hat{q}}^T & [\omega_G\times]^2 \\ 0_{3\times 3} & 0_{3\times 3} & 0_{3\times 3} & 0_{3\times 3} & 0_{3\times 3} \\ 0_{3\times 3} & 0_{3\times 3} & I_3 & 0_{3\times 3} & 0_{3\times 3} \end{bmatrix}$$

where $I_3$ is the 3×3 identity matrix, and $$G = \begin{bmatrix} -I_3 & 0_{3\times 3} & 0_{3\times 3} & 0_{3\times 3} \\ 0_{3\times 3} & I_3 & 0_{3\times 3} & 0_{3\times 3} \\ 0_{3\times 3} & 0_{3\times 3} & -C_{\hat{q}}^T & 0_{3\times 3} \\ 0_{3\times 3} & 0_{3\times 3} & 0_{3\times 3} & I_3 \\ 0_{3\times 3} & 0_{3\times 3} & 0_{3\times 3} & 0_{3\times 3} \end{bmatrix}$$

2) Discrete-Time Implementation

The IMU samples the signals $\omega_m$ and $a_m$ with a period T, and these measurements are used for state propagation in the EKF. Every time a new IMU measurement is received, the IMU state estimate is propagated using 5th order Runge-Kutta numerical integration of Equation 9. The EKF covariance matrix is also propagated. For this purpose, consider the following partitioning for the covariance:

$$P_{k|k} = \begin{bmatrix} P_{II_{k|k}} & P_{IC_{k|k}} \\ P_{IC_{k|k}}^T & P_{CC_{k|k}} \end{bmatrix} \quad \text{(Equation 11)}$$

where $P_{II_{k|k}}$ the 15×15 covariance matrix of the evolving IMU state, $P_{CC_{k|k}}$ is the 6N×6N covariance matrix of the camera pose estimates, and $P_{IC_{k|k}}$ is the correlation between the errors in the IMU state and the camera pose estimates. With this notation, the covariance matrix of the propagated state is given by:

$$P_{k+1|k} = \begin{bmatrix} P_{II_{k+1|k}} & \Phi(t_k+T, t_k)P_{IC_{k|k}} \\ P_{IC_{k|k}}^T \Phi(t_k+T, t_k)^T & P_{CC_{k|k}} \end{bmatrix}$$

where $P_{II_{k+1|k}}$ is computed by numerical integration of the Lyapunov equation:

$$\dot{P}_{II} = FP_{II} + P_{II}F^T + GQ_{IMU}G^T \quad \text{(Equation 12)}$$

Numerical integration is carried out for the time interval $(t_k, t_k+T)$, with initial condition $P_{II_{k|k}}$. The state transition matrix $\Phi(t_k+T, t_k)$ is similarly computed by numerical integration of the differential equation $$\dot{\Phi}(t_k + \tau, t_k) = F\Phi(t_k + \tau, t_k), \tau \in [0, t] \quad \text{(Equation 13)}$$

with initial condition $\Phi(t_k, t_k) = I_{15}$.

C. State Augmentation

Upon recording a new image, the camera pose estimate is computed from the IMU pose estimate as:

$${}_G^C\hat{q} = {}_I^C\bar{q} \otimes {}_G^I\hat{q}, \text{ and } {}^G\hat{p}_C = {}^G\hat{p}_I + C_{\hat{q}}^{TI}p_C \quad \text{(Equation 14)}$$

where ${}_I^C\bar{q}$ is the quaternion expressing the rotation between the IMU and camera frames, and ${}^Ip_C$ is the position of the origin of the camera frame with respect to {I}, both of which are known. This camera pose estimate is appended to the state vector, and the covariance matrix of the EKF is augmented accordingly:

$$P_{k|k} \leftarrow \begin{bmatrix} I_{6N+15} \\ J \end{bmatrix} P_{k|k} \begin{bmatrix} I_{6N+15} \\ J \end{bmatrix}^T \quad \text{(Equation 15)}$$

where the Jacobian J is derived from Equation 14 as:

$$J = \begin{bmatrix} C({}_I^C\bar{q}) & 0_{3\times9} & 0_{3\times3} & 0_{3\times6N} \\ \lfloor C_{\hat{q}}^{TI}p_C\times\rfloor & 0_{3\times9} & I_3 & 0_{3\times6N} \end{bmatrix} \quad \text{(Equation 16)}$$

D. Measurement Model

Consider next the measurement model employed for updating the state estimates. Since the EKF is used for state estimation, for constructing a measurement model it suffices to define a residual, r, that depends linearly on the state errors, $\tilde{X}$, according to the general form:

$$r = H\tilde{X} + \text{noise} \quad \text{(Equation 17)}$$

In this expression H is the measurement Jacobian matrix, and the noise term must be zero-mean, white, and uncorrelated to the state error, for the EKF framework to be applied.

Viewing a static feature from multiple camera poses results in constraints involving all these poses. Here, the camera observations are grouped per tracked feature, rather than per camera pose where the measurements were recorded. All the measurements of the same 3D point are used to define a constraint equation (cf. Equation 24), relating all the camera poses at which the measurements occurred. This is achieved without including the feature position in the filter state vector.

Consider the case of a single feature, $f_j$, that has been observed from a set of $M_j$ camera poses $({}_G^{C_i}\bar{q}, {}^Gp_{C_i})$, $i \in S_j$. Each of the $M_j$ observations of the feature is described by the model:

$$z_i^{(j)} = \frac{1}{{}^{C_i}Z_j}\begin{bmatrix} {}^{C_i}X_j \\ {}^{C_i}Y_j \end{bmatrix} + n_i^{(j)}, i \in S_j \quad \text{(Equation 18)}$$

where $n_i^{(j)}$ is the $2\times1$ image noise vector, with covariance matrix $R_i^{(j)} = \sigma_{im}^2 I_2$. The feature position expressed in the camera frame, ${}^{C_i}p_{f_j}$, is given by:

$${}^{C_i}p_{f_j} = \begin{bmatrix} {}^{C_i}X_j \\ {}^{C_i}Y_j \\ {}^{C_i}Z_j \end{bmatrix} = C({}_G^{C_i}\bar{q})({}^Gp_{f_j} - {}^Gp_{C_i}) \quad \text{(Equation 19)}$$

where ${}^Gp_{f_j}$ is the 3D feature position in the global frame. Since this is unknown, in the first step of the algorithm, employ a least-squares minimization to obtain an estimate, ${}^G\hat{p}_{f_j}$, of the feature position. This is achieved using the measurements $z_i^{(j)}$, $i \in S_j$, and the filter estimates of the camera poses at the corresponding time instants.

Following the estimation of the feature position, compute the measurement residual:

$$r_i^{(j)} = z_i^{(j)} - \hat{z}_i^{(j)} \quad \text{(Equation 20)}$$

where $$\hat{z}_i^{(j)} = \frac{1}{{}^{C_i}\hat{Z}_j}\begin{bmatrix} {}^{C_i}\hat{X}_j \\ {}^{C_i}\hat{Y}_j \end{bmatrix}, \begin{bmatrix} {}^{C_i}X_j \\ {}^{C_i}Y_j \\ {}^{C_i}Z_j \end{bmatrix} = C({}_G^{C_i}\hat{\bar{q}})({}^G\hat{p}_{f_j} - {}^G\hat{p}_{C_i})$$

Linearizing about the estimates for the camera pose and for the feature position, the residual of Equation 20 can be approximated as:

$$r_i^{(j)} \simeq H_{X_i}^{(j)}\tilde{X} + H_{f_i}^{(j)}{}^G\tilde{p}_{f_j} + n_i^{(j)} \quad \text{(Equation 21)}$$

In the preceding expression $H_{X_i}^{(j)}$ and $H_{f_i}^{(j)}$ the Jacobians of the measurement $z_i^{(j)}$ with respect to the state and the feature position, respectively, and ${}^G\tilde{p}_{f_j}$ is the error in the position estimate of $f_j$. The exact values of the Jacobians in this expression are generally available. Stacking the residuals of all $M_j$ measurements of this feature yields:

$$r^{(j)} \simeq H_X^{(j)}\tilde{X} + H_f^{(j)}{}^G\tilde{p}_{f_j} + n^{(j)} \quad \text{(Equation 22)}$$

where $r^{(j)}$, $H_X^{(j)}$, $H_f^{(j)}$, and $n^{(j)}$ are block vectors or matrices with elements $r_i^{(j)}$, $H_{X_i}^{(j)}$, $H_{f_i}^{(j)}$, and $n_i^{(j)}$, for $i \in S_j$. Since the feature observations in different images are independent, the covariance matrix of $n^{(j)}$ is $R^{(j)} = \sigma_{im}^2 I_{2M_j}$.

Note that since the state estimate, $\hat{X}$, is used to compute the feature position estimate, the error ${}^G\tilde{p}_{f_j}$ Equation 22 is correlated with the errors $\tilde{X}$. Thus, the residual $r^{(j)}$ is not in the form of Equation 17, and cannot be directly applied for measurement updates in the EKF. To overcome this, define a residual $r_o^{(j)}$, by projecting $r^{(j)}$ on the left nullspace of the matrix $H_f^{(j)}$. Specifically, let A denote the unitary matrix whose columns form the basis of the left nullspace of $H_f$ to obtain:

$$r_o^{(j)} = A^T(z^{(j)} - \hat{z}^{(j)}) \simeq A^T H_X^{(j)} \tilde{X} + A^T n^{(j)} \quad \text{(Equation 23)}$$

$$= H_o^{(j)} \tilde{X} + n_o^{(j)} \quad \text{(Equation 24)}$$

Since the $2M_j \times 3$ matrix $H_f^{(j)}$ has full column rank, its left nullspace is of dimension $2M_j - 3$. Therefore, $r_o^{(j)}$ is a $(2M_j - 3) \times 1$ vector. This residual is independent of the errors in the feature coordinates, and thus EKF updates can be performed based on it. Equation 24 defines a linearized constraint between all the camera poses from which the feature $f_j$ was observed. This expresses all the available information that the measurements $z_i^{(j)}$ provide for the $M_j$ states, and thus the resulting EKF update is optimal, except for the inaccuracies caused by linearization.

In order to compute the residual $r_o^{(j)}$ and the measurement matrix $H_o^{(j)}$, the unitary matrix A does not need to be explicitly evaluated. Instead, the projection of the vector r and the matrix $H_x^{(j)}$ on the nullspace of $H_f^{(j)}$ can be computed very efficiently using Givens rotations, in $O(M_j^2)$ operations. Additionally, since the matrix A is unitary, the covariance matrix of the noise vector $n_o^{(j)}$ is given by:

$$E\{n_o^{(j)} n_o^{(j)T}\} = \sigma_{im}^2 A^T A = \sigma_{im}^2 I_{2M_j - 3}$$

The residual defined in Equation 23 is not the only possible expression of the geometric constraints that are induced by observing a static feature in $M_j$ images. An alternative approach is, for example, to employ the epipolar constraints that are defined for each of the $M_j(M_j-1)/2$ pairs of images. However, the resulting $M_j(M_j-1)/2$ equations would still correspond to only $2M_j-3$ independent constraints, since each measurement is used multiple times, rendering the equations statistically correlated. Experimental data shows that employing linearization of the epipolar constraints results in a significantly more complex implementation, and yields inferior results compared to the approach described above.

E. EKF Updates

The preceding section presents a measurement model that expresses the geometric constraints imposed by observing a static feature from multiple camera poses. Next, consider the update phase of the EKF, in which the constraints from observing multiple features are used. EKF updates are triggered by one of the following two events:

When a feature that has been tracked in a number of images is no longer detected, then all the measurements of this feature are processed using the method presented above in the section concerning Measurement Model. This case occurs most often, as features move outside the camera's field of view.

Every time a new image is recorded, a copy of the current camera pose estimate is included in the state vector (see the section concerning State Augmentation). If the maximum allowable number of camera poses, $N_{max}$, has been reached, at least one of the old ones must be removed. Prior to discarding states, all the feature observations that occurred at the corresponding time instants are used, in order to utilize their localization information. In one example, choose $N_{max}/3$ poses that are evenly spaced in time, starting from the second-oldest pose. These are discarded after carrying out an EKF update using the constraints of features that are common to these poses. One example always retains the oldest pose in the state vector, because the geometric constraints that involve poses further back in time typically correspond to larger baseline, and hence carry more valuable positioning information.

Consider next the update process. At a given time step the constraints of L features, selected by the above two criteria, must be processed. Following the procedure described in the preceding section, compute a residual vector $r_o^{(j)}$, j=1 . . . L, as well as a corresponding measurement matrix $H_o^{(j)}$, j=1 . . . L for each of these features (cf. Equation 23). Stacking all residuals in a single vector yields:

$$r_o = H_x \tilde{X} + n_o \quad \text{(Equation 25)}$$

where $r_o$ and $n_o$ are vectors with block elements $r_o^{(j)}$ and $n_o^{(j)}$, j=1 . . . L respectively, and Hx is a matrix with block rows $H_x^{(j)}$, j=1 . . . L.

Since the feature measurements are statistically independent, the noise vectors $n_o^{(j)}$ are uncorrelated. Therefore, the covariance matrix of the noise vector $n_o$ is equal to $R_o = \sigma_{im}^2 I_d$, where $d = \Sigma_{j=1}^{L}(2M_j - 3)$ is the dimension of the residual $r_o$. In practice, d can be a quite large number. For example, if 10 features are seen in 10 camera poses each, the dimension of the residual is 170. In order to reduce the computational complexity of the EKF update, employ the QR decomposition of the matrix Hx. Specifically, denote this decomposition as $$H_x = [Q_1 \quad Q_2] \begin{bmatrix} T_H \\ 0 \end{bmatrix}$$

where $Q_1$ and $Q_2$ are unitary matrices whose columns form bases for the range and nullspace of Hx, respectively, and $T_H$ is an upper triangular matrix. With this definition, Equation 25 yields:

$$r_0 = [Q_1 \quad Q_2] \begin{bmatrix} T_H \\ 0 \end{bmatrix} \tilde{X} + n_o \Rightarrow \quad \text{(Equation 26)}$$

$$\begin{bmatrix} Q_1^T r_o \\ Q_2^T r_o \end{bmatrix} = \begin{bmatrix} T_H \\ 0 \end{bmatrix} \tilde{X} + \begin{bmatrix} Q_1^T n_o \\ Q_2^T n_o \end{bmatrix} \quad \text{(Equation 27)}$$

From the last equation it becomes clear that by projecting the residual $r_o$ on the basis vectors of the range of Hx, all the useful information in the measurements is retained. The residual $Q_2^T r_o$ is only noise, and can be completely discarded. For this reason, instead of the residual shown in Equation 25, employ the following residual for the EKF update:

$$r_n = Q_1^T r_o = T_H \tilde{X} + n_n \quad \text{(Equation 28)}$$

In this expression $n_n = Q_1^T n_o$ a noise vector whose covariance matrix is equal to $R_n = Q_1^T R_o Q_1 = \sigma_{im}^2 I_r$, with r being the number of columns in $Q_1$. The EKF update proceeds by computing the Kalman gain:

$$K = PT_H^T(T_H PT_H^T + R_n)^{-1} \quad \text{(Equation 29)}$$

while the correction to the state is given by the vector $$\Delta X = Kr_n \quad \text{(Equation 30)}$$

In addition, the state covariance matrix is updated according to:

$$P_{k+1|k+1} = (I_\xi - KT_H)P_{k+1|k}(I_\xi - KT_H)^T + KR_n K^T \quad \text{(Equation 31)}$$

where $\xi=6N+15$ is the dimension of the covariance matrix.

Consider the computational complexity of the operations needed during the EKF update. The residual $r_n$, as well as the matrix $T_H$, can be computed using Givens rotations in $O(r^2 d)$ operations, without the need to explicitly form $Q_1$. On the other hand, Equation 31 involves multiplication of square matrices of dimension $\xi$, an $O(\xi^3)$ operation. Therefore, the cost of the EKF update is $\max(O(r^2 d), O(\xi^3))$. If, on the other hand, the residual vector $r_o$ was employed, without projecting it on the range of $H_x$, the computational cost of computing the Kalman gain would have been $O(d^3)$. Since typically $d \gg \xi$, r, the use of the residual $r_n$ results in substantial savings in computation.

Discussion

Consider next some of the properties of the described algorithm. As shown elsewhere in this document, the filter's computational complexity is linear in the number of observed features, and at most cubic in the number of states that are included in the state vector. Thus, the number of poses that are included in the state is the most significant factor in determining the computational cost of the algorithm. Since this number is a selectable parameter, it can be tuned according to the available computing resources, and the accuracy requirements of a given application. In one example, the length of the filter state is adaptively controlled during filter operation, to adjust to the varying availability of resources.

One source of difficulty in recursive state estimation with camera observations is the nonlinear nature of the measurement model. Vision-based motion estimation is very sensitive to noise, and, especially when the observed features are at large distances, false local minima can cause convergence to inconsistent solutions. The problems introduced by nonlinearity can be addressed using techniques such as Sigma-point Kalman filtering, particle filtering, and the inverse depth representation for features. The algorithm is robust to linearization inaccuracies for various reasons, including (i) the inverse feature depth parametrization used in the measurement model and (ii) the delayed linearization of measurements. According to the present subject matter, multiple observations of each feature are collected prior to using them for EKF updates, resulting in more accurate evaluation of the measurement Jacobians.

In typical image sequences, most features can only be reliably tracked over a small number of frames ("opportunistic" features), and only a few can be tracked for long periods of time, or when revisiting places (persistent features). This is due to the limited field of view of cameras, as well as occlusions, image noise, and viewpoint changes, that result in failures of the feature tracking algorithms. If all the poses in which a feature has been seen are included in the state vector, then the proposed measurement model is optimal, except for linearization inaccuracies. Therefore, for realistic image sequences, the present algorithm is able to use the localization information of the opportunistic features. Also note that the state vector $X_k$ is not required to contain only the IMU and camera poses. In one example, the persistent features can be included in the filter state, and used for SLAM. This can improve the attainable localization accuracy within areas with lengthy loops.

EXPERIMENTAL EXAMPLE

The algorithm described herein has been tested both in simulation and with real data. Simulation experiments have verified that the algorithm produces pose and velocity estimates that are consistent, and can operate reliably over long trajectories, with varying motion profiles and density of visual features.

The following includes the results of the algorithm in an outdoor experiment.

The experimental setup included a camera/IMU system, placed on a car that was moving on the streets of a typical residential area in Minneapolis, MN. The system included a Pointgrey FireFly camera, registering images of resolution 640×480 pixels at 3 Hz, and an Inertial Science ISIS IMU, providing inertial measurements at a rate of 100 Hz. During the experiment all data were stored on a computer and processing was done off-line. Some example images from the recorded sequence are shown in FIGS. 3A-3D.

The recorded sequence included a video of 1598 images representing about 9 minutes of driving.

For the results shown here, feature extraction and matching was performed using the SIFT algorithm. During this run, a maximum of 30 camera poses was maintained in the filter state vector. Since features were rarely tracked for more than 30 images, this number was sufficient for utilizing most of the available constraints between states, while attaining real-time performance. Even though images were only recorded at 3 Hz due to limited hard disk space on the test system, the estimation algorithm is able to process the dataset at 14 Hz, on a single core of an Intel T7200 processor (2 GHz clock rate). During the experiment, a total of 142903 features were successfully tracked and used for EKF updates, along a 3.2 km-long trajectory. The quality of the position estimates can be evaluated using a map of the area.

Figure 4:
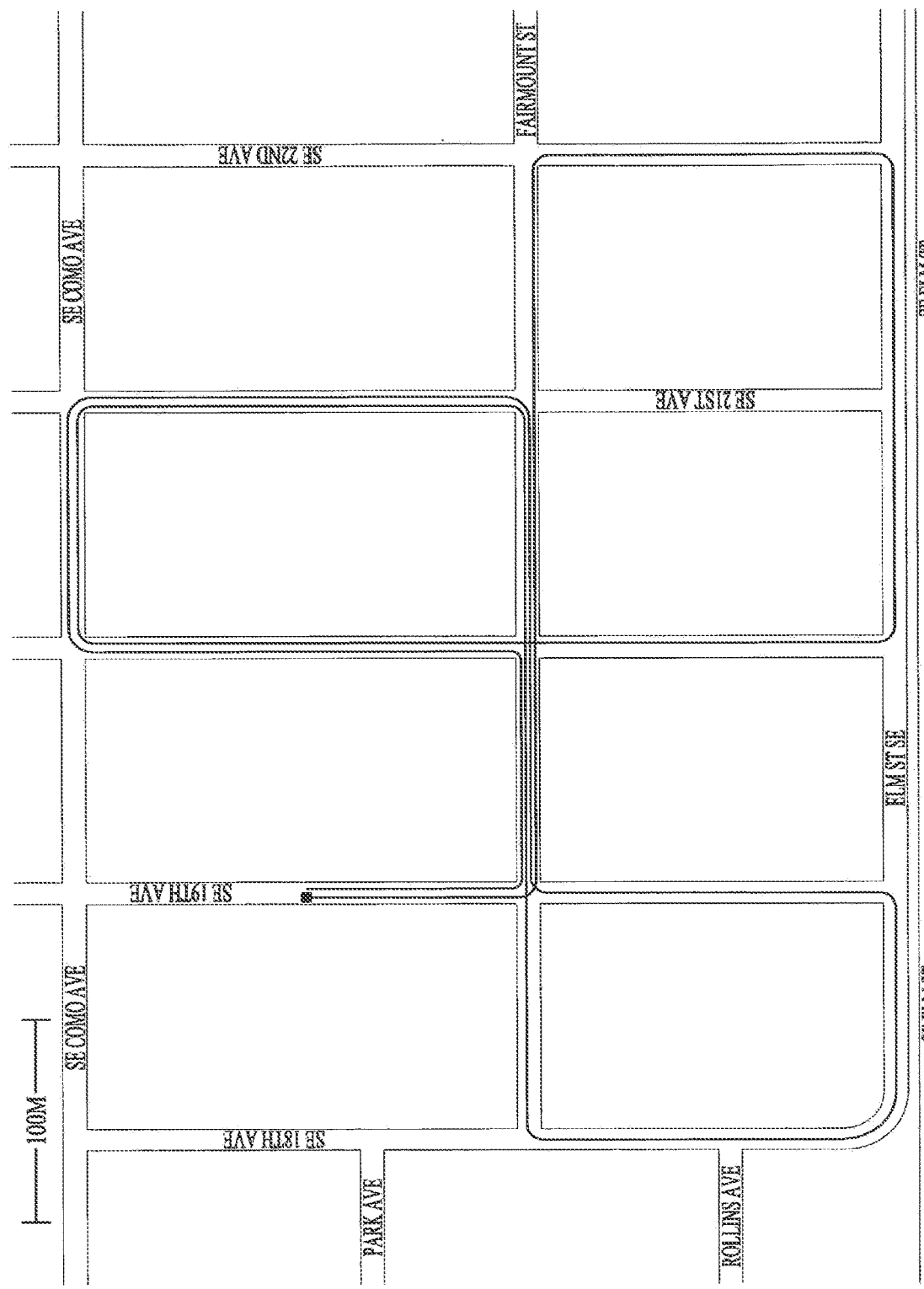
FIG. 4 illustrates an estimated trajectory overlaid on a map.

In FIG. 4, the estimated trajectory is plotted on a map of the neighborhood where the experiment took place. The initial position of the car is denoted by a red square on SE 19$^{th}$ Avenue, and the scale of the map is shown on the top left corner.

Figure 5A:
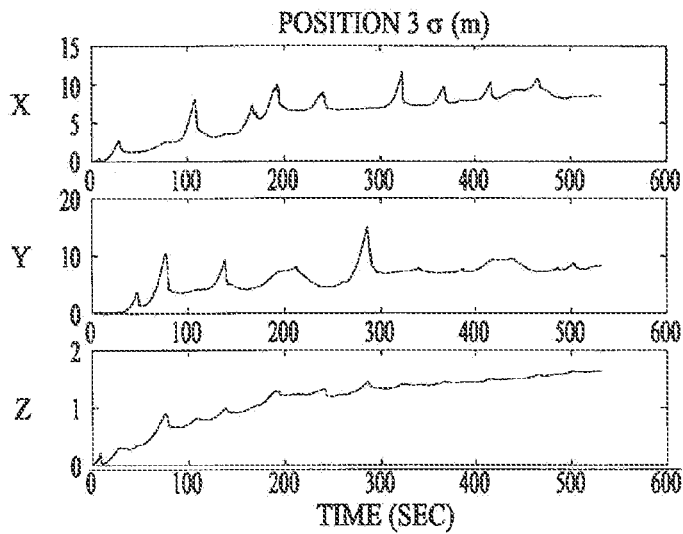
FIGS. 5A-5C illustrates position, attitude and velocity for x-axis, y-axis, and z-axis.
Figure 5B:
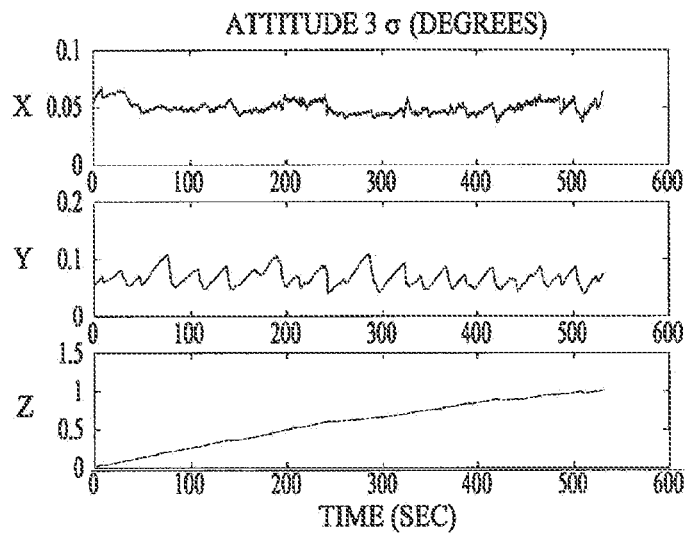
Figure 5C:
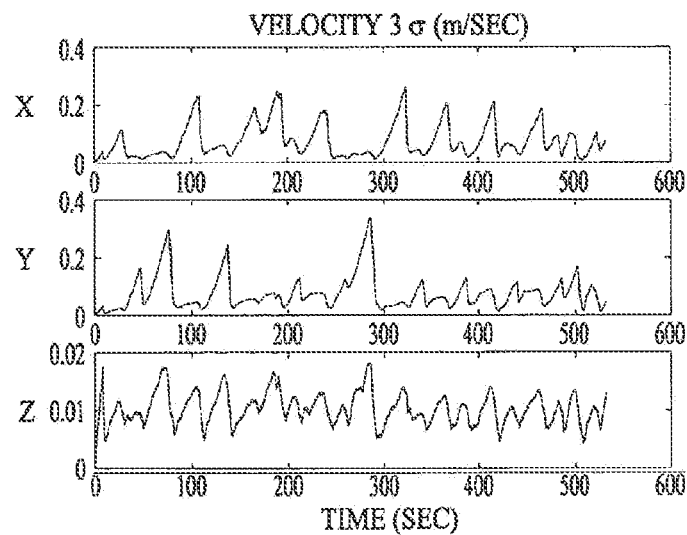

FIGS. 5A-5C are graphs illustrating the 3σ bounds for the errors in the position, attitude, and velocity, respectively. The plotted values are 3-times the square roots of the corresponding diagonal elements of the state covariance matrix. Note that the EKF state is expressed in ECEF frame, but for plotting, all quantities have been transformed in the initial IMU frame, whose x axis is pointing approximately south, and its y axis east.

The trajectory follows the street layout quite accurately and, additionally, the position errors that can be inferred from this plot agree with the 3σ bounds shown in FIG. 5A. The final position estimate, expressed with respect to the starting pose, is $\hat{X}_{final}=[-7.92 \; 13.14 \; -0.78]^T$ m. From the initial and final parking spot of the vehicle it is known that the true final position expressed with respect to the initial pose is approximately $X_{final}=[0\ 7\ 0]^T$ m. Thus, the final position error is approximately 10 m in a trajectory of 3.2 km, i.e., an error of 0.31% of the traveled distance. This is remarkable, given that the algorithm does not utilize loop closing, and uses no prior information (for example, non-holonomic constraints or a street map) about the car motion. Note also that the camera motion is almost parallel to the optical axis, a condition which is particularly adverse for image-based motion estimation algorithms. In FIG. 5B and FIG. 5C, the $3\sigma$ bounds for the errors in the IMU attitude and velocity along the three axes are shown. From these, observe that the algorithm obtains accuracy ($3\sigma$) better than $1°$ for attitude, and better than 0.35 msec for velocity in this particular experiment.

The results demonstrate that the algorithm is capable of operating in a real-world environment, and producing very accurate pose estimates in real-time. Note that in the dataset presented here, several moving objects appear, such as cars, pedestrians, and trees whose leaves move in the wind. The algorithm is able to discard the outliers which arise from visual features detected on these objects, using a simple Mahalanobis distance test. Robust outlier rejection is facilitated by the fact that multiple observations of each feature are available, and thus visual features that do not correspond to static objects become easier to detect. Note also that the method can be used either as a stand-alone pose estimation algorithm, or combined with additional sensing modalities to provide increased accuracy. For example, a GPS sensor (or other type of sensor) can be used to compensate for position drift.

The present subject matter includes an EKF-based estimation algorithm for real-time vision-aided inertial navigation. One aspect of this work is the derivation of a measurement model that is able to express the geometric constraints that arise when a static feature is observed from multiple camera poses. This measurement model does not require including the 3D feature positions in the state vector of the EKF, and is optimal, up to the errors introduced by linearization. The resulting EKF-based pose estimation algorithm has computational complexity linear in the number of features, and is capable of very accurate pose estimation in large-scale real environments. One example includes fusing inertial measurements with visual measurements from a monocular camera. However, the approach is general and can be adapted to different sensing modalities both for the proprioceptive, as well as for the exteroceptive measurements (e.g., for fusing wheel odometry and laser scanner data).

Selected Calculations

Intersection can be used to compute an estimate of the position of a tracked feature $f_j$. To avoid local minima, and for better numerical stability, during this process, use an inverse-depth parametrization of the feature position. In particular, if $\{Cn\}$ is the camera frame in which the feature was observed for the first time, then the feature coordinates with respect to the camera at the i-th time instant are:

$$^{C_i}p_{f_j} = C(^{C_i}_{C_n}\bar{q})^{C_n}p_{f_j} + {}^{C_i}p_{C_n}, i \in S_j \quad \text{(Equation 32)}$$

In this expression $C(_{C_n}{}^{C_i}\bar{q})$ and $^{C_i}p_{C_n}$ are the rotation and translation between the camera frames at time instants n and i, respectively. Equation 32 can be rewritten as:

$$^{C_i}p_{f_j} = {}^{C_n}Z_j \left( C(^{C_i}_{C_n}\bar{q}) \begin{bmatrix} \frac{{}^{C_n}X_j}{{}^{C_n}Z_j} \\ \frac{{}^{C_n}Y_j}{{}^{C_n}Z_j} \\ 1 \end{bmatrix} + \frac{1}{{}^{C_n}Z_j} {}^{C_i}p_{C_n} \right) \quad \text{(Equation 33)}$$

$$= {}^{C_n}Z_j \left( C(^{C_i}_{C_n}\bar{q}) \begin{bmatrix} \alpha_j \\ \beta_j \\ 1 \end{bmatrix} + \rho_j {}^{C_i}p_{C_n} \right) \quad \text{(Equation 34)}$$

$$= {}^{C_n}Z_j \begin{bmatrix} h_{i1}(\alpha_j, \beta_j, \rho_j) \\ h_{i2}(\alpha_j, \beta_j, \rho_j) \\ h_{i3}(\alpha_j, \beta_j, \rho_j) \end{bmatrix} \quad \text{(Equation 35)}$$

In the last expression $h_{i1}$, $h_{i2}$ and $h_{i3}$ are scalar functions of the quantities $\alpha_j$, $\beta_j$, $\rho_j$, which are defined as:

$$\alpha_j = \frac{{}^{C_n}X_j}{{}^{C_n}Z_j}, \beta_j = \frac{{}^{C_n}Y_j}{{}^{C_n}Z_j}, \rho_j = \frac{1}{{}^{C_n}Z_j}, \quad \text{(Equation 36)}$$

Substituting from Equation 35 into Equation 18, express the measurement equations as functions of $\alpha_j$, $\beta_j$, and $\rho_j$ only:

$$z_i^{(j)} = \frac{1}{h_{i3}(\alpha_j, \beta_j, \rho_j)} \begin{bmatrix} h_{i1}(\alpha_j, \beta_j, \rho_j) \\ h_{i2}(\alpha_j, \beta_j, \rho_j) \end{bmatrix} + n_i^{(j)} \quad \text{(Equation 37)}$$

Given the measurements $z_i^{(j)}$, $i \in S_j$, and the estimates for the camera poses in the state vector, obtain estimates for $\hat{\alpha}_j$, $\hat{\beta}_j$, and $\hat{\rho}_j$, and using Gauss-Newton least squares minimization. Then, the global feature position is computed by:

$$^G\hat{p}_{f_j} = \frac{1}{\hat{\rho}_j} C^T(^{C_n}_G\hat{\bar{q}}) \begin{bmatrix} \hat{\alpha}_j \\ \hat{\beta}_j \\ 1 \end{bmatrix} + {}^G\hat{p}_{C_n} \quad \text{(Equation 38)}$$

Note that during the least-squares minimization process the camera pose estimates are treated as known constants, and their covariance matrix is ignored. As a result, the minimization can be carried out very efficiently, at the expense of the optimality of the feature position estimates. Recall, however, that up to a first-order approximation, the errors in these estimates do not affect the measurement residual (cf. Equation 23). Thus, no significant degradation of performance is inflicted.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (for example, compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A vision-aided inertial navigation system comprising:
   at least one image source capable of providing image data comprising images captured at a plurality of poses along a trajectory within an environment over a period of time, wherein the image data includes features that were each observed within the environment at multiple poses along the trajectory;
   a motion sensor configured to provide motion data in the environment for the period of time; and
   a processor communicatively coupled to the at least one image source and communicatively coupled to the motion sensor, the processor configured to compute estimates for at least a position and orientation for at least some of the plurality of poses along the trajectory, wherein the processor is configured to:
     determine, from the image data, feature measurements corresponding to one or more features observed from any of the plurality of poses along the trajectory;
     for one or more of the features observed from multiple poses along the trajectory, compute one or more constraints based upon estimates for positions, within the environment, for the one or more of the features, wherein the estimated positions are obtained using the image data;
     determine the position and orientation for at least some of the plurality of poses along the trajectory by updating, in accordance with the motion data and the one or more computed constraints, state information within a state vector, wherein the state vector represents estimates for position and orientation along the trajectory; and
     output, for display, information responsive to the updated state information, wherein the estimates for positions, within the environment, for the one or more of the features observed from multiple poses along the trajectory are maintained separately from the state vector.

2. The vision-aided inertial navigation system of claim 1, wherein the processor is configured to compute each of the one or more constraints by manipulating a residual of a measurement for a corresponding feature, of the one or more of the features observed from multiple poses along the trajectory, to reduce an effect of a feature estimate error.

3. The vision-aided inertial navigation system of claim 1, wherein:
   the at least one image source includes a camera, and
   the vision-aided inertial navigation system comprises at least one of a robot or a vehicle.

4. The vision-aided inertial navigation system of claim 1, wherein the motion sensor includes an inertial measurement unit (IMU).

5. The vision-aided inertial navigation system of claim 1, wherein the processor is configured to execute an Extended Kalman Filter (EKF) to compute the one or more constraints.

6. The vision-aided inertial navigation system of claim 1, further including an output device coupled to the processor, the output device including at least one of a memory, a transmitter, a display, a printer, an actuator, or a controller.

7. The vision-aided inertial navigation system of claim 1, wherein the processor computes at least one constraint based on the feature measurements for features observed at three or more of the plurality of poses along the trajectory.

8. A method, comprising:
   receiving, with a processor and from at least one image source communicatively coupled to the processor, image data comprising images captured at a plurality of poses along a trajectory within an environment over a period of time, wherein the image data includes features observed within the environment at multiple poses along the trajectory;

receiving, with the processor and from a motion sensor communicatively coupled to the processor, motion data in the environment for the period of time; and computing, with the processor, state estimates for at least a position and orientation for at least some of the plurality of poses along the trajectory, wherein computing the state estimates comprises:

determining, from the image data, feature measurements corresponding to one or more features observed from any of the plurality of poses along the trajectory;

for one or more of the features observed from the plurality of poses along the trajectory, computing one or more constraints based upon estimates for positions within the environment for the one or more of the features, wherein the estimated positions are obtained using the image data;

determining the position and orientation for at least some of the plurality of poses along the trajectory by updating, in accordance with the motion data and the one or more computed constraints, state information within a state vector, wherein the state vector represents estimates for position and orientation along the trajectory;

outputting, for display, information responsive to the updated state information, wherein the estimates for positions within the environment for the one or more of the features observed from multiple poses along the trajectory are maintained separately from the state vector; and controlling, responsive to the computed state estimates, navigation along the trajectory.

9. The method of claim 8, wherein computing each of the one or more constraints comprises manipulating a residual of a measurement of a corresponding feature, of the one or more of the features observed from multiple poses along the trajectory, to reduce an effect of a feature estimate error.

10. The method of claim 8, wherein computing the state estimates further includes computing state estimates for at least one of a velocity or an acceleration along the trajectory.

11. The method of claim 8, wherein receiving the image data includes receiving data from at least one of a camera-based sensor, a laser-based sensor, a sonar-based sensor, or a radar-based sensor.

12. The method of claim 8, wherein receiving the motion data from the motion sensor includes receiving data from at least one of a wheel encoder, a velocity sensor, a Doppler radar-based sensor, a gyroscope, an accelerometer, an airspeed sensor, or a global positioning system (GPS) sensor.

13. The method of claim 8, wherein computing the one or more constraints comprises executing an Extended Kalman Filter (EKF).

14. The method of claim 8, wherein at least one constraint is computed based on the feature measurements for features observed at three or more of the plurality of poses along the trajectory.

15. A non-transitory computer-readable storage medium comprising instructions that configure a processor to:

receive, with the processor and from at least one image source communicatively coupled to the processor, image data comprising images captured at a plurality of poses along a trajectory within an environment over a period of time, wherein the image data includes features observed within the environment at multiple poses along the trajectory;

receive, with the processor and from a motion sensor communicatively coupled to the processor, motion data in the environment for the period of time;

determine, from the image data, feature measurements corresponding to one or more features observed from any of the plurality of poses along the trajectory;

for one or more of the features observed from the plurality of poses along the trajectory, compute one or more constraints based upon estimates for positions within the environment for the one or more features, where the estimated positions are obtained using the image data;

determine state estimates for at least a position and an orientation for at least some of the plurality of poses along the trajectory by updating, in accordance with the motion data and the one or more computed constraints, state information within a state vector, wherein the state vector represents estimates for position and orientation along the trajectory; and output, for display, information responsive to the updated state information, wherein the estimates for positions within the environment for the one or more of the features observed from multiple poses along the trajectory are maintained separately from the state vector.

16. The non-transitory computer-readable storage medium of claim 15, wherein the instructions configure the processor to compute at least one of:

the one or more constraints, each of which is computed by manipulating a residual of a measurement for a corresponding feature, of the one or more of the features observed from multiple poses along the trajectory, to reduce an effect of a feature estimate error; or state estimates for at least one of a velocity or an acceleration along the trajectory.

17. The non-transitory computer-readable storage medium of claim 15, wherein the image data includes data from at least one of a camera-based sensor, a laser-based sensor, a sonar-based sensor, or a radar-based sensor.

18. The non-transitory computer-readable storage medium of claim 15, wherein the motion data includes data from at least one of a wheel encoder, a velocity sensor, a Doppler radar-based sensor, a gyroscope, an accelerometer, an airspeed sensor, or a global positioning system (GPS) sensor.

19. The non-transitory computer-readable storage medium of claim 15, wherein the instructions configure the processor to execute an Extended Kalman Filter (EKF) to compute the one or more constraints.

20. The non-transitory computer-readable storage medium of claim 15, wherein at least one constraint is computed based on the feature measurements for features observed at three or more of the plurality of poses along the trajectory.

* * * * *